(12) United States Patent
Kosako

(10) Patent No.: US 11,837,832 B2
(45) Date of Patent: Dec. 5, 2023

(54) COMPOSITE MATERIAL STRUCTURE AND COMPOSITE MATERIAL STRUCTURE PRODUCING METHOD

(71) Applicant: Yazaki Corporation, Tokyo (JP)

(72) Inventor: Terukazu Kosako, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 320 days.

(21) Appl. No.: 17/352,521

(22) Filed: Jun. 21, 2021

(65) Prior Publication Data
US 2022/0006209 A1  Jan. 6, 2022

(30) Foreign Application Priority Data
Jul. 6, 2020 (JP) .................................. 2020-116362

(51) Int. Cl.
*H01R 4/64* (2006.01)
*H01R 4/34* (2006.01)
(Continued)

(52) U.S. Cl.
CPC ................. *H01R 4/64* (2013.01); *C08K 7/02* (2013.01); *H01R 4/34* (2013.01); *H01R 11/12* (2013.01);
(Continued)

(58) Field of Classification Search
CPC .......... H01B 7/08; H01B 7/02; H01B 7/2813; H01B 13/00; H01R 4/64; H01R 2201/26; H01R 11/12; H01R 13/405; H01R 4/34; B60R 16/02; C08K 7/02; C08K 2201/001; B32B 7/025; B32B 27/08; H02G 3/08; H02G 3/081; H02G 3/088
(Continued)

(56) References Cited

U.S. PATENT DOCUMENTS 7,445,455 B2 * 11/2008 Yokozuka ............ H05K 5/0069
174/262
8,653,379 B2 * 2/2014 Inoue ..................... H05K 3/325
174/256
(Continued)

FOREIGN PATENT DOCUMENTS

| JP | 61-151283 A | 7/1986 |
|----|----|----|
| JP | 2009-163941 A | 7/2009 |
| JP | 2016-183885 A | 10/2016 |

*Primary Examiner* — Angel R Estrada
(74) *Attorney, Agent, or Firm* — Sughrue Mion, PLLC

(57) ABSTRACT

A composite material structure that prevents occurrence of galvanic corrosion while exposing a part of a conductor embedded in a conductive resin portion as a connecting portion, is provided. The composite material structure includes a conductive resin portion formed of an electrically conductive reinforced resin in which conductive fibers are contained in a base material, a conductor formed of a conductive material and embedded in the conductive resin portion with a part of the conductor exposed as a connecting portion for electrical connection with another component, and an insulator that is formed of an insulating material and that is at least partially embedded in the conductive resin portion so as to be interposed between the conductive reinforced resin and the conductor so as to prevent the connecting portion of the conductor from contacting the conductive reinforced resin.

11 Claims, 15 Drawing Sheets

(51) Int. Cl.
*H01R 11/12* (2006.01)
*C08K 7/02* (2006.01)

(52) U.S. Cl.
CPC .... *C08K 2201/001* (2013.01); *H01R 2201/26* (2013.01)

(58) Field of Classification Search
USPC ....... 174/68.1, 50, 520, 559, 50.5, 535, 539, 174/251, 256, 260, 262, 72 A, 77 R; 361/600, 601; 220/3.2, 3.3, 4.02
See application file for complete search history.

(56) References Cited

U.S. PATENT DOCUMENTS

| | | | |
|---|---|---|---|
| 8,766,104 B2 * | 7/2014 | Moul | H05K 1/183 174/260 |
| 10,794,552 B2 * | 10/2020 | Lin | H01B 9/005 |
| 2016/0279903 A1 | 9/2016 | Fujita et al. | |

* cited by examiner

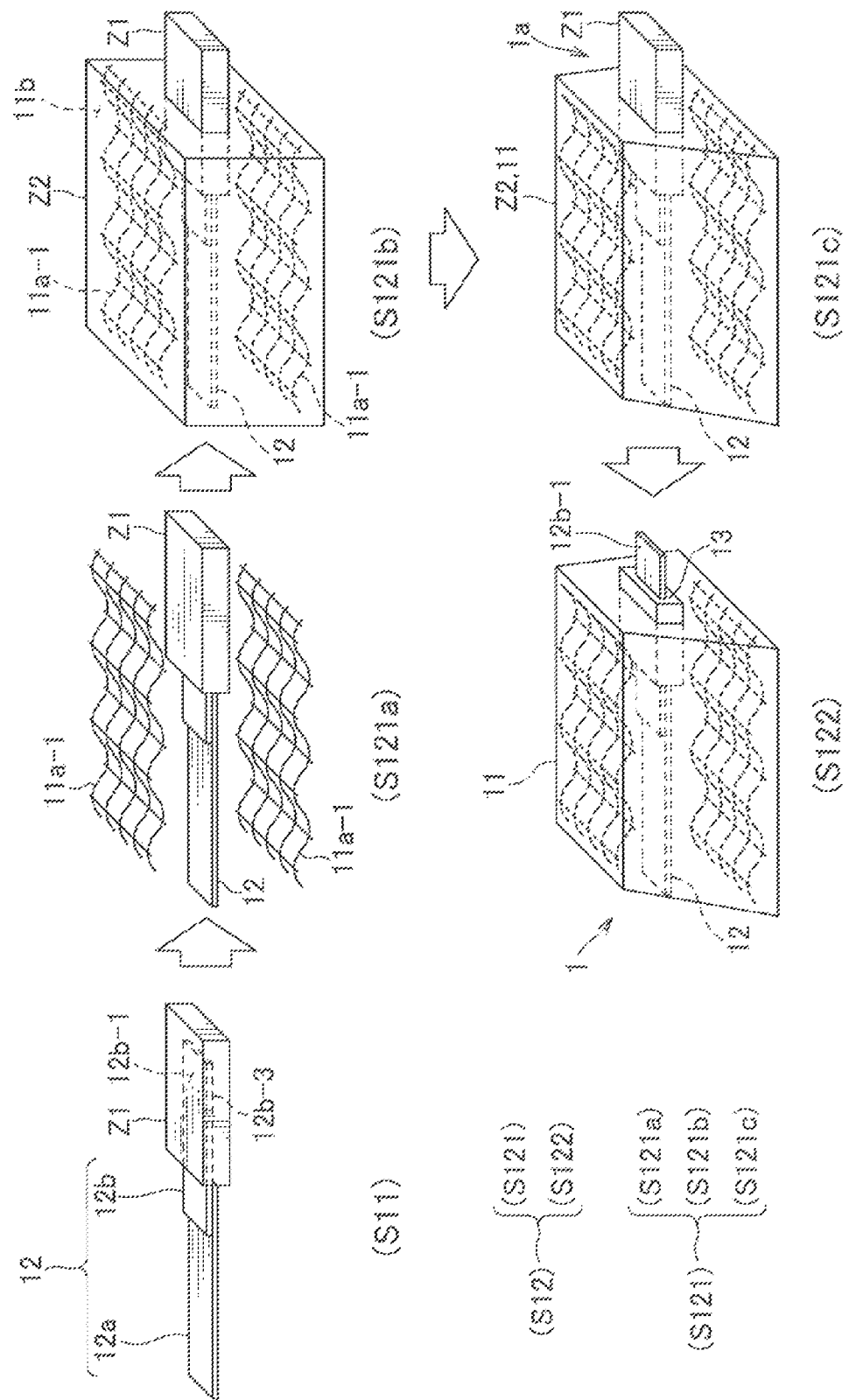

COMPOSITE MATERIAL STRUCTURE AND COMPOSITE MATERIAL STRUCTURE PRODUCING METHOD

TECHNICAL FIELD

The present invention relates to a composite material structure in which a conductor is embedded in a conductive resin portion formed of an electrically conductive reinforced resin, and a composite material structure producing method for obtaining such composite material structure.

BACKGROUND

In recent years, along with multi-materialization of vehicle bodies, reinforced resins which are reinforced with carbon fibers such as CFRP (Carbon Fiber Reinforced Plastics) and CFRTP (Carbon Fiber Reinforced Thermo Plastics) have begun to be used for vehicle body structures (for example, refer to Patent Document 1). When using such a reinforced resin for a vehicle body structure, there is a problem of securing a ground point, and one possible solution can be, for example, a composite material structure in which a conductor is embedded in a resin portion formed of a reinforced resin, and an electrical connecting portion is exposed as a ground point from the conductor to the outside of the resin. Although not intended for securing a ground point, Patent Document 1 exemplary shows a composite material structure in which a connecting portion as described above is provided in a conductor embedded in a resin portion formed of a reinforced resin.

PRIOR ART DOCUMENT

Patent Document 1: JP 2016-183885 A

SUMMARY OF THE INVENTION

Problem to be Solved by the Invention

In the composite material structure exemplary shown in Patent Document 1, the resin portion itself in which the conductor is embedded corresponds to a conductive resin portion formed of a conductive reinforced resin containing conductive fibers such as carbon fibers. As a result, a contact state equivalent to the contact between dissimilar metals is produced at a portion such as a basal portion of the connecting portion where the conductor exposed as the connecting portion and the conductive resin portion contact with each other. When a liquid such as water gets onto that portion, this can possibly cause galvanic corrosion due to the contact between dissimilar metals.

In view of the problem as described above, an object of the present invention is to provide a composite material structure capable of preventing galvanic corrosion while exposing a part of a conductor embedded in a conductive resin portion as a connecting portion. Another object of the present invention is to provide a composite material structure producing method for obtaining said composite material structure.

Solution to the Problem

In order to achieve the above-described object, the present invention provides a composite material structure including a conductive resin portion formed of an electrically conductive reinforced resin in which conductive fibers are contained in a base material, a conductor formed of an electrically conductive material and embedded in the conductive resin portion with a part of the conductor exposed as a connecting portion for electrical connection with another component, and an insulator which is formed of an insulating material and at least a part of which is embedded in the conductive resin portion so as to be interposed between the conductive reinforced resin and the conductor so as to prevent the connecting portion of the conductor from contacting the conductive reinforced resin.

In order to achieve the above-described object, the present invention further provides a composite material structure producing method including a first step of covering, with an insulating material, at least a part of a conductor formed of an electrically conductive material, and a second step of forming a conductive resin portion and an insulator using the conductor covered with the insulating material and using a conductive reinforced resin in which conductive fibers are contained in a base material, the conductor being embedded in the conductive resin portion with a part of the conductor exposed as a connecting portion for electrical connection with another component, and the insulator being at least partially embedded in the conductive resin portion so as to be interposed between the conductive reinforced resin and the conductor so as to prevent the connecting portion of the conductor from contacting the conductive reinforced resin.

Advantageous Effect of the Invention

According to the composite material structure and the composite material structure producing method described above, the contact between the connecting portion at which a part of the conductor is exposed and the conductive reinforced resin forming the conductive resin portion is prevented by the insulator which is at least partially embedded in the conductive resin portion so as to be interposed between the conductive reinforced resin and the conductor. This prevention of the contact can avoid the contact state equivalent to the contact between dissimilar metals at a portion such as the basal portion of the connecting portion, thereby preventing galvanic corrosion. Thus, according to the composite material structure and the composite material structure producing method described above, it is possible to prevent galvanic corrosion while exposing a part of the conductor embedded in the conductive resin portion as the connecting portion.

BRIEF DESCRIPTION OF THE DRAWINGS

FIG. 27 is a schematic diagram showing a flow of a composite material structure producing method for obtaining the composite material structure of the first embodiment.

DETAILED DESCRIPTION OF THE EXEMPLARY EMBODIMENTS

One embodiment of a composite material structure and of a composite material structure producing method according to the present invention will be described. Firstly, a first embodiment of a composite material structure will be described with reference to FIG. 1 and FIG. 2.

Figure 1:
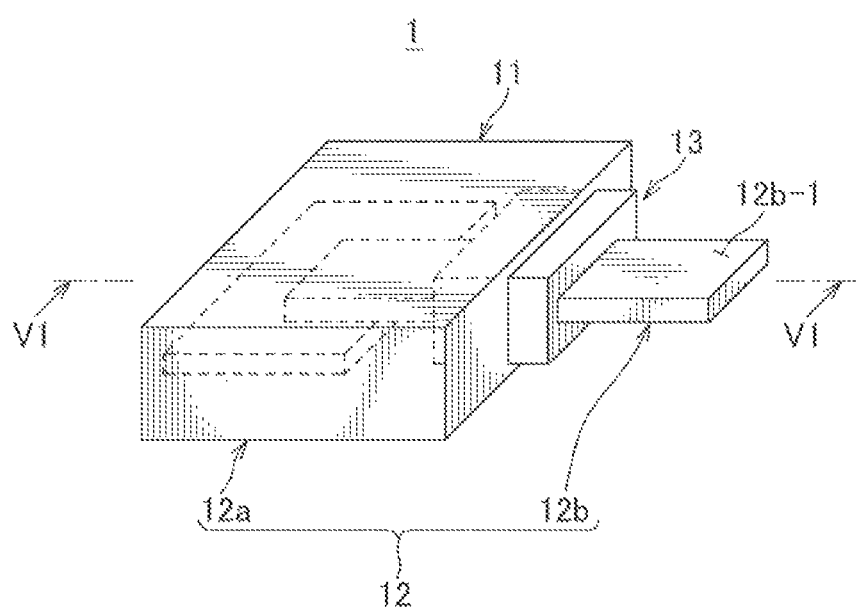
FIG. 1 is a schematic perspective view showing a composite material structure of a first embodiment.
Figure 2:
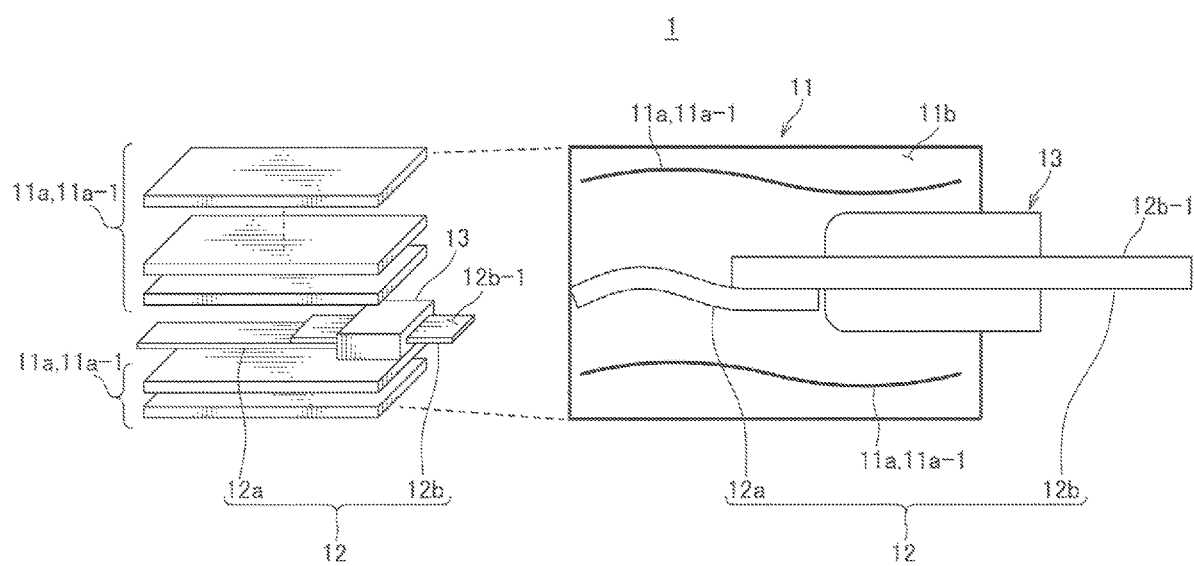
FIG. 2 is a schematic diagram showing an internal configuration of the composite material structure shown in FIG. 1.

FIG. 1 is a schematic perspective view showing a composite material structure of the first embodiment, and FIG. 2 is a schematic view showing an internal configuration of the composite material structure shown in FIG. 1. FIG. 2 shows a schematic exploded perspective view of a composite material structure 1 shown in FIG. 1 and a schematic cross-sectional view taken along the line V1-V1 in FIG. 1.

The composite material structure 1 of this embodiment is a structure in which a conductor 12 is embedded in a conductive resin portion 11, and a part of the conductor 12 is exposed as a connecting portion 12b-1 for connection with another component. The composite material structure 1 includes the conductive resin portion 11, the conductor 12 and an insulator 13.

As shown in FIG. 2, the conductive resin portion 11 is a portion formed of an electrically conductive reinforced resin in which conductive fibers 11a are contained in a resin insulating base material 11b. In this embodiment, although the conductive resin portion 11 is shown in a flat rectangular parallelepiped shape as one example, the shape thereof is not limited to this and may be any shape according to the actual applications thereof.

One example of the conductive fibers 11a is reinforcing fibers having electrical conductivity such as carbon fibers. Other examples of the reinforcing fibers include aluminum fibers, copper fibers, stainless steel fibers and the like.

As the base material 11b, either an insulating resin or a conductive resin can be used. Examples of the insulating resin include thermosetting resins such as epoxy, phenol, unsaturated polyester, vinyl ester, cyanate ester, polyimide and the like. Examples of the insulating resin may also include thermoplastic resins such as polyamide, polycarbonate, polyphenylene sulfide, polyetheretherketone and the like. The conductive resin is obtained by adding the following additives to the above-mentioned insulating resin to impart conductivity. Examples of the additives for imparting conductivity include conductive polymers such as polythiophene, oligothiophene, polypyrrole, and polyaniline. Further, examples of the additives may also include conductive fillers such as carbon-based, metal-based, metal oxide-based, metal-coated, and metal oxide-coated conductive fillers.

In this embodiment, as shown in FIG. 2, to incorporate the conductive fibers 11a into the base material 11b, a stack of the conductive fiber sheets 11a-1 formed of the conductive fibers 11a is impregnated with the molten base material 11b. However, the method of incorporating the conductive fibers 11a into the base material 11b is not limited to this, and for example, fiber pieces obtained by shredding the conductive fibers 11a may be kneaded into the molten base material 11b.

The conductor 12 is a portion formed of an electrically conductive material and embedded in the conductive resin portion 11 with a part of the conductor 12 exposed as a connecting portion 12b-1 for electrical connection with another component. In this embodiment, the conductor 12 includes a first conductor 12a which is entirely embedded in the conductive resin portion 11, and a second conductor 12b which is joined to the first conductor 12a inside the conductive resin portion 11 and a part of which is the connecting portion 12b-1. The second conductor 12b is an electrode to which another component such as an electric wire is connected, as will be described later.

In this embodiment, the first conductor 12a and the second conductor 12b of the conductor 12 are shown in a rectangular flat plate shape as one example. However, the shape thereof is not limited to the rectangular flat plate shape, and the first and second conductors may each be in any shape. In this embodiment, the first conductor 12a to be embedded in the conductive resin portion 11 is illustrated as a rectangular flat plate along the shape of the conductive resin portion 11, as shown in the perspective view of FIG. 1 and the exploded perspective view of FIG. 2. On the other hand, the cross-sectional view of FIG. 2 shows the first conductor 12a in the corrugated form to show that the first conductor 12a can be in any shape inside the conductive resin portion 11 also, regardless of the shape of the conductive resin portion 11. Further, the second conductor 12b a part of which is the connecting portion 12b-1 for connection with another component, may be in any shape that allows connection with another component such as an electric wire.

Examples of the material of the first conductor 12a include carbon fibers and the following metal materials which are generally used as materials for conductive components. That is, examples of the metal material include aluminum, copper, gold, other metals and alloys thereof, and the like. The shape of the first conductor 12a may be any shape as described above and may be, for example, a plate shape, a foil shape, a shaped of a sheet woven with metal fibers, a shape of a mesh formed roughly with metal wires, a linear shape, a rod shape, a tubular shape and such.

Examples of the material of the second conductor 12b used as the electrode include metal materials such as aluminum, copper, gold, other metals and alloys thereof and the like. In this embodiment, the second conductor 12b is shown in a rectangular flat plate shape as shown in FIG. 1 and FIG. 2. However, the shape of the second conductor is not limited to this as described above and may be another shape such as a shape of a round terminal and the like, as long as it allows connection with another component such as an electric wire.

In this embodiment, the first conductor 12a and the second conductor 12b as described above are joined inside the conductive resin portion 11 with ends thereof in surface contact with each other to form the conductor 12. A method of joining them may include general joining methods such as melt joining, solid phase joining, brazing, bonding and mechanical joining such as crimping, riveting, bolting and the like.

The insulator 13 is formed of an insulating material and is a portion partially embedded in the conductive resin portion 11 so as to be interposed between the conductive reinforced resin and the conductor 12 so as to prevent the connecting portion 12b-1 of the conductor 12 from contacting the conductive reinforced resin that forms the conductive resin portion 11. In this embodiment, the insulator 13 is shown in a rectangular parallelepiped shape as one example. This shape is an example of the shape that matches the second conductor 12b including a rectangular flat plate shape. However, the shape of the insulator 13 is not limited to this and may be any shape as long as it can be interposed between the conductive reinforced resin forming the conductive resin portion 11 and the conductor 12.

The insulating material forming the insulator 13 may be any material that can secure the insulating property, and examples thereof include resin, rubber, elastomer and ceramics. In the case where the insulator 13 is formed of resin, rubber or elastomer, a forming method thereof may include, injection molding, extrusion molding, blow molding, vacuum molding, pressure molding, compression molding, casting molding, foam molding, hot melt molding, potting and such. In the case where the insulator 13 is formed of ceramics, a forming method thereof may include machining and such. The second conductor 12b of the conductor 12 is press-fitted into the insulator 13 formed in the manner as described above, thereby the insulator 13 is attached to the conductor 12. In addition, in the case where the insulator 13 is formed of resin, rubber or elastomer, a surface of the second conductor 12b of the conductor 12 may be coated with these materials to simultaneously perform the formation of the insulator 13 and the attachment of the insulator 13 to the conductor 12.

In this embodiment, the conductive resin portion 11, the conductor 12 and the insulator 13 described above are combined in the manner as described below to form the composite material structure 1. Firstly, a part of the insulator 13 is protruding from one end surface which is a surface of the conductive resin portion 11 formed into a rectangular parallelepiped. The conductor 12 includes the connecting portion 12b-1 which corresponds to a part of the second conductor 12b that is further protruding from the part of the insulator 13 protruding from the conductive resin portion 11 and that is exposed.

In another embodiment, the insulator 13 may be configured so as not to protrude from one end surface of the conductive resin portion 11 and to have an exposed surface flush with this one end surface. In this case, the connecting portion 12b-1 of the conductor 12 is configured to protrude from the exposed surface of the insulator 13 which is flush with the one end surface of the conductive resin portion 11.

Next, a composite material structure according to a second embodiment will be described with reference to FIG. 3.

Figure 3:
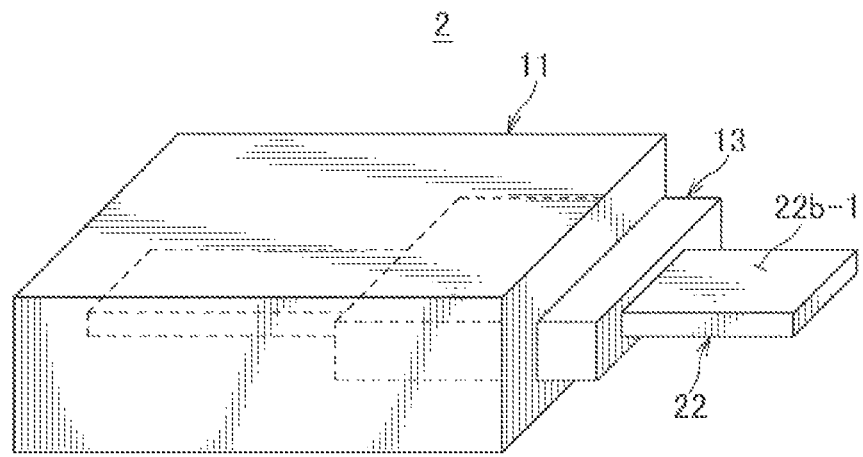
FIG. 3 is a schematic perspective view showing a composite material structure of a second embodiment.

FIG. 3 is a schematic perspective view showing the composite material structure of the second embodiment. In FIG. 3, the components equivalent to those in the first embodiment shown in FIG. 1 and FIG. 2 are shown with the same reference signs as those in FIG. 1 and FIG. 2, and in the following, duplicate explanations about these equivalent components are omitted.

In a composite material structure 2 of this embodiment, a conductor 22 is a single component, unlike the conductor 12 of the first embodiment described above which is constituted of two components joined together. In this embodiment, the conductor 22 which is a rectangular flat plate embedded inside the conductive resin portion 11 extends to the outside of the conductive resin portion 11 as it is, and is exposed to provide a connecting portion 22b-1 with a part of the conductor 22 protruding from the insulator 13. In this embodiment, the conductor 22 has a thickness and strength sufficient to be used as an electrode including the connecting portion 22b-1 for connection with another component, and thus, a part of the conductor 22 is used as an electrode, as it is, eliminating the need for providing a separate electrode as in the first embodiment.

Next, a composite material structure according to a third embodiment will be described with reference to FIG. 4.

Figure 4:
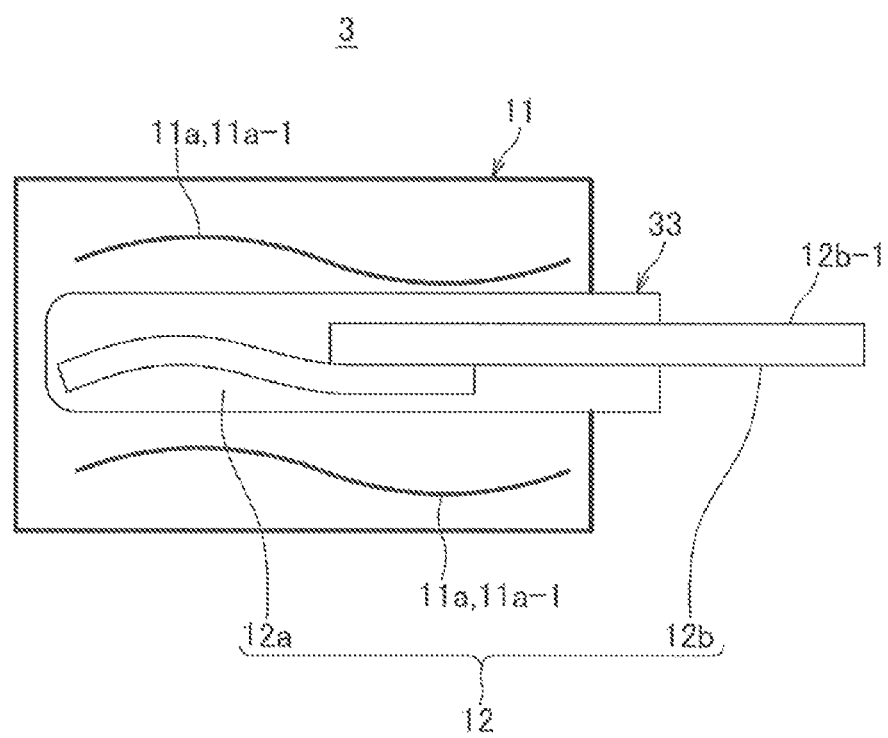
FIG. 4 is a schematic cross-sectional view showing a composite material structure of a third embodiment.

FIG. 4 is a schematic cross-sectional view showing the composite material structure of the third embodiment. In FIG. 4 also, the components equivalent to those in the first embodiment shown in FIG. 1 and FIG. 2 are shown with the same reference signs as those in FIG. 1 and FIG. 2, and in the following, duplicate explanations about those components are omitted.

In the composite material structure 3 of this embodiment, the insulator 33 is formed so as to cover not only a part of the second conductor 12b of the conductor 12, but also the entire first conductor 12a including a joined portion with the second conductor 12b. That is, in this embodiment, the entire embedded portion of the conductor 12 embedded in the conductive resin portion 11 is insulated by the insulator 33 so as not to come into contact with the conductive reinforced resin forming the conductive resin portion 11. Thus, the embedded portion of the conductor 12 embedded in the conductive resin portion 11 can be used not only as a chassis ground but also as an electrical circuit pattern. In this case, various electrical/electronic components connected to the conductor 12 as a circuit pattern may also be embedded in the conductive resin portion 11.

Next, two connection examples of connecting another component to the connecting portion 12b-1, 22b-1 of the conductor 12, 22 of the first to third embodiments described above will be described. These connection examples are common between the first to third embodiments, thus the following explanation is given with reference to the composite material structure 1 of the first embodiment as a representative example.

Figure 5:
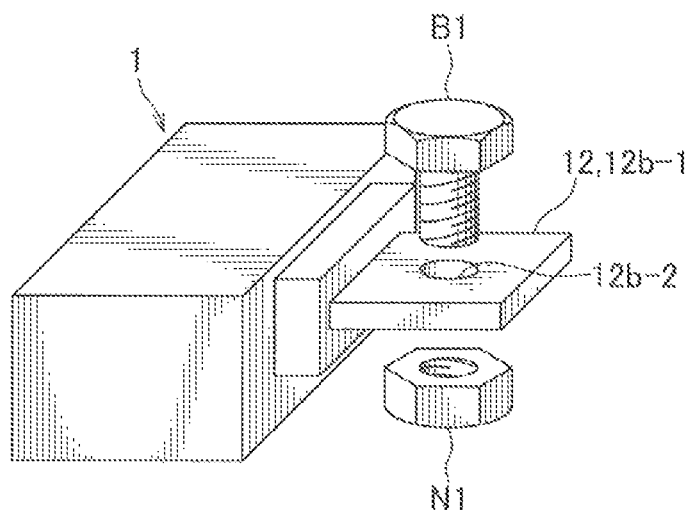
FIG. 5 is a schematic perspective view showing a first connection example with respect to a connecting portion of a conductor of the first embodiment.

FIG. 5 is a schematic perspective view showing a first connection example with respect to the connecting portion of the conductor of the first embodiment.

In the first connection example, a through hole 12b-2 for connection is provided at the connecting portion 12b-1 of the conductor 12 of the composite material structure 1. Another component is to be fastened and connected to the connecting portion 12b-1 by a bolt B1 inserted through the through hole 12b-2 and a nut N1 screwed to the bolt B1. Examples of the another component in this example include a bus bar formed of a metal plate, an electric wire including, at its end, a connecting component such as a round terminal that can be fastened using the bolt B1 and the nut N1, and the like.

As a modified example of this first connection example, a screw hole in which the bolt B1 can be screwed may be provided instead of the through hole 12b-2, or the nut N1 may be welded and fixed to the connecting portion 12b-1, for example. Further, as another example, the bolt B1 may be welded and fixed to the connecting portion 12b-1 with the screw portion passed through the through hole 12b-2 protruding therefrom.

Figure 6:
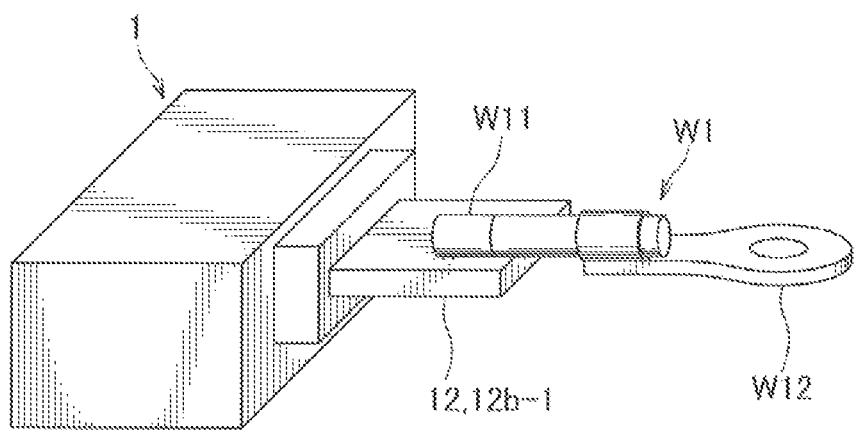
FIG. 6 is a schematic perspective view showing a second connection example with respect to a connecting portion of a conductor of the first embodiment.

FIG. 6 is a schematic perspective view showing a second connection example with respect to the connecting portion of the conductor of the first embodiment.

In the second connection example, an exposed core wire W11 on one end side of an electric wire with terminal W1 as another component is soldered and fixed to the connecting portion 12b-1 of the conductor 12 of the composite material structure 1. A round terminal W12 for connection with an electric/electronic device is crimped to the other end side of the electric wire with terminal W1.

As a modified example of this second connection example, instead of the electric wire with terminal W1, one end of a connector terminal of a connector may be soldered and fixed, for example. Further, as an example of the connecting method for connection with respect to the connecting portion 12b-1, ultrasonic welding, crimping, or the like may be used instead of soldering.

According to the composite material structures 1, 2, 3 of the first to third embodiments described above, the following advantageous effect can be obtained. That is, according to the composite material structures 1, 2, 3 described above, the insulator 13 can prevent the contact between the connecting portion 12b-1, 22b-1 in which a part of the conductor 12, 22 is exposed and the conductive reinforced resin forming the conductive resin portion 11. The insulator 13 is a portion which is at least partially embedded in the conductive resin portion 11 with the insulator 13 being interposed between the conductive reinforced resin and the conductor 12, 22. With the insulator 13 being interposed in this manner, the contact between the connecting portion 12b-1, 22b-1 and the conductive reinforced resin is prevented.

Unlike the first to third embodiments, if the insulator 13 is not present, then the basal portion of the connecting portion 12b-1, 22b-1 is exposed in a state of being in contact with the conductive reinforced resin. Since the contact between the connecting portion 12b-1, 22b-1 and the conductive reinforced resin is a contact state equivalent to the contact between dissimilar metals, galvanic corrosion may occur when water or the like gets onto said basal portion.

In contrast, in the first to third embodiments, the insulator 13 prevents the contact state equivalent to the contact between dissimilar metals at the basal portion of the connecting portion 12b-1, 22b-1, thereby preventing galvanic corrosion. Thus, according to the composite material structures 1, 2, 3 of the first to third embodiments, galvanic corrosion can be prevented while exposing the part of the conductor 12, 22 embedded in the conductive resin portion 11 as the connecting portion 12b-1, 22b-1.

In the first to third embodiments, the part of the insulator 13 protrudes from the surface of the conductive resin portion 11, and the connecting portion 12b-1, 22b-1 of the conductor 12, 22 is exposed from this protruded portion. According to this configuration, the reliability of the prevention of the contact between the connecting portion 12b-1, 22b-1 and the conductive reinforced resin can be improved, thereby further preventing galvanic corrosion.

Further, in the first to third embodiments, the connecting portion 12b-1, 22b-1 is the part of the conductor 12, 22 that is protruding from the part of the insulator 13 that is exposed from the conductive resin portion 11. According to this configuration, since the connecting portion 12b-1, 22b-1 protrudes from the insulator 13, attachment of an electric wire and the like to the connecting portion 12b-1, 22b-1, for example, can be performed with good workability.

Further, in the first embodiment and the third embodiment, the conductor 12 includes the first conductor 12a that is entirely embedded in the conductive resin portion 11, and the second conductor 12b that is joined to the first conductor 12a and that is partly formed as the connecting portion 12b-1. According to this configuration, the conductor 12 is divided into the first conductor 12a that is entirely embedded in the conductive resin portion 11 to be used as a chassis ground and such, for example, and the second conductor 12b that is partially formed as the connecting portion 12b-1. Since the conductor is divided in this manner, the respective parts of the conductor 12 can be formed of conductive materials suitable for the purpose of use.

Further, in the first to third embodiments, the second conductor 12b is an electrode. This configuration is preferable since an electric wire and the like as another component can be connected easily using the connection examples shown in FIG. 5 and FIG. 6, for example.

Next, a composite material structure according to a fourth embodiment will be described with reference to FIG. 7.

Figure 7:
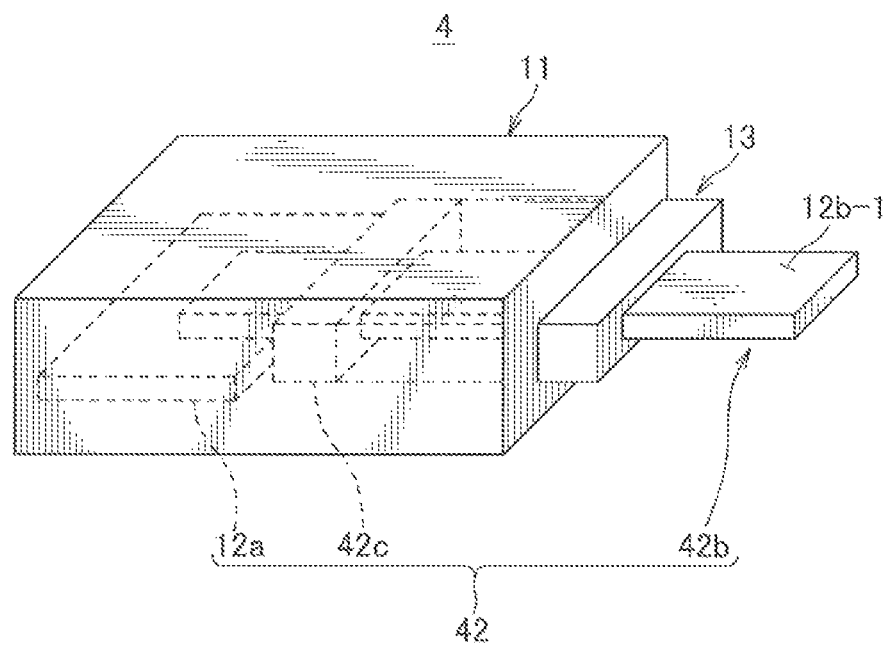
FIG. 7 is a schematic perspective view showing a composite material structure of a fourth embodiment.

FIG. 7 is a schematic perspective view showing the composite material structure of the fourth embodiment. In FIG. 7 also, the components equivalent to those in the first embodiment shown in FIG. 1 and FIG. 2 are shown with the same reference signs as those in FIG. 1 and FIG. 2, and in the following, duplicate explanations about these equivalent components are omitted.

In the composite material structure 4 of this embodiment, a second conductor 42b of the conductor 42 which is joined to the first conductor 12a and which is partially exposed, is provided with a protrusion 42c arranged to be in close contact with the insulator 13 inside the conductive resin portion 11. The protrusion 42c is arranged in the shape of a rectangular parallelepiped and arranged across the middle of the strip-shaped second conductor 42b, and one side surface of the protrusion 42c along the longitudinal direction is in close contact with the insulator 13.

In the composite material structure 4 of the fourth embodiment described above also, galvanic corrosion can be prevented while exposing the part of the conductor 42 embedded in the conductive resin portion 11 as the connecting portion 12b-1, as in the first embodiment described above.

Further, according to this embodiment, the conductor 42 is provided with the protrusion 42c arranged to be in close contact with the insulator 13 inside the conductive resin portion 11, thereby strengthening the contact between the conductor 42 and the insulator 13. In addition, since the protrusion 42c serves as a stopper against an external force applied to the connecting portion 12b-1 in the direction of pulling the conductor 42 from the insulator 13, the strength of the composite material structure 4 against such external force can be improved.

As a modified example of the fourth embodiment, the shape of the protrusion 42c of the conductor 42 may be changed from a rectangular parallelepiped to a shape other than a rectangular parallelepiped such as a polygonal cylinder, a circular cylinder and the like. In another modified example, as a configuration that strengthens the contact between the conductor 42 and the insulator 13 and that serves as a stopper, the portion of the conductor 42 embedded in the insulator 13 may have a concavo-convex shape in which protrusions and indents with respect to a direction intersecting the direction of the above-described external force are arranged alternately along the direction of the external force. In another example, the portion of the conductor 42 embedded in the insulator 13 may be provided with a through hole, and the inside of the through hole may also be filled with an insulating material that forms the insulator 13.

Next, a composite material structure according to a fifth embodiment will be described with reference to FIG. 8.

Figure 8:
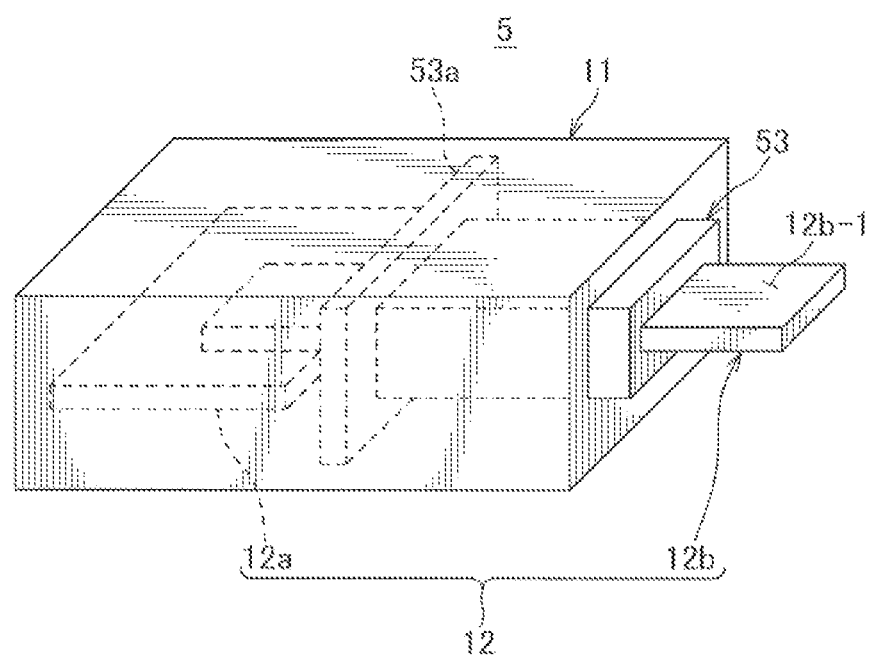
FIG. 8 is a schematic perspective view showing a composite material structure of a fifth embodiment.

FIG. 8 is a schematic perspective view showing the composite material structure of the fifth embodiment. In FIG. 8 also, the components equivalent to the components in the first embodiment shown in FIG. 1 and FIG. 2 are shown with the same reference signs as those in FIG. 1 and FIG. 2, and in the following, duplicate explanations about these equivalent components are omitted.

In the composite material structure 5 of this embodiment, an end surface of an insulator 53 opposite to the connecting portion 12b-1 is provided with a single protrusion 53a extending over the entire circumference.

In the composite material structure 5 of the fifth embodiment described above also, galvanic corrosion can be prevented while exposing the part of the conductor 12 embedded in the conductive resin portion 11 as the connecting portion 12b-1, as in the first embodiment and such described above.

Further, according to this embodiment, by providing the protrusion 53a on the surface of the insulator 53, the contact between the conductive resin portion 11 and the insulator 53 can be strengthened, thereby improving the strength of the composite material structure 5.

As a modified example of the fifth embodiment, the protrusion 53a may be formed on the insulator 53 at a position other than at the end thereof, such as at the center of the insulator 53, and/or a plurality of protrusions 53a may be formed. In another example, the protrusion 53a may be provided at a part of the insulator 53 in the circumferential direction instead of providing over the entire circumference of the insulator 53, or the protrusion 53a may be provided intermittently in the circumferential direction.

Next, a composite material structure according to a sixth embodiment will be described with reference to FIG. 9.

Figure 9:
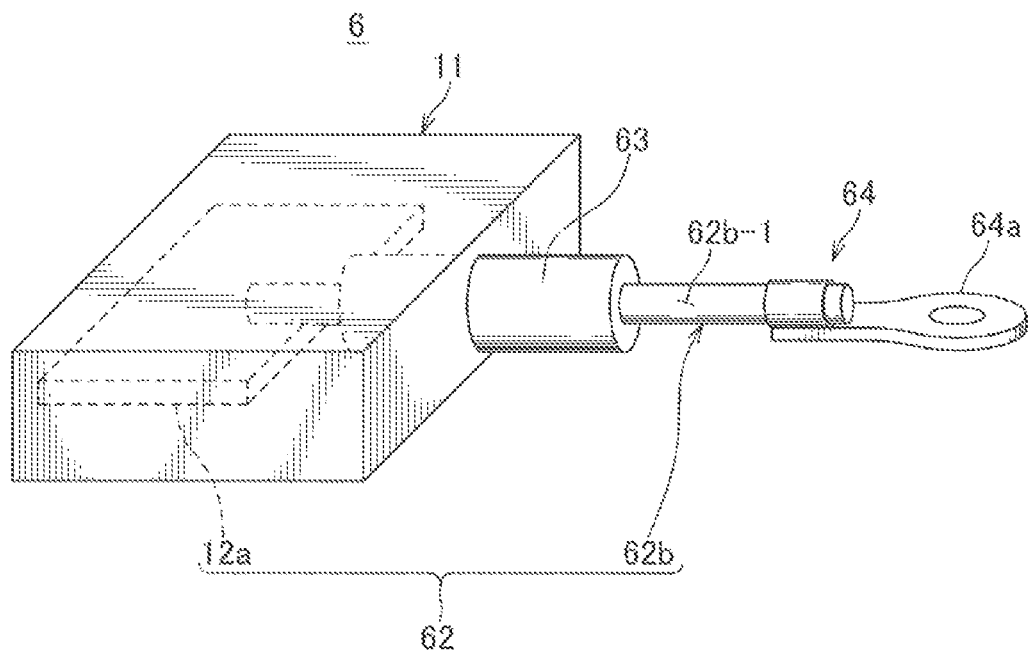
FIG. 9 is a schematic perspective view showing a composite material structure of a sixth embodiment.

FIG. 9 is a schematic perspective view showing the composite material structure of the sixth embodiment. In FIG. 9 also, the components equivalent to the components in the first embodiment shown in FIG. 1 and FIG. 2 are shown with the same reference signs as those in FIG. 1 and FIG. 2, and in the following, duplicate explanations about these equivalent components are omitted.

In the composite material structure 6 of this embodiment, one end of a core wire of a covered electric wire 64 is joined to the first conductor 12a embedded in the conductive resin portion 11 inside the conductive resin portion 11. Examples of the joining method herein include soldering, ultrasonic welding, crimping or the like. The other end side of the covered electric wire 64 protrudes from the conductive resin portion 11 with a part of the cover remaining inside the conductive resin portion 11, and a part of the core wire is exposed on this other end side. As another component, a round terminal 64a for connection with an electric/electronic device is crimp-connected to this exposed core wire.

In the composite material structure 6 including the covered electric wire 64 as described above, a second conductor 62b that together with the first conductor 12a constitutes a conductor 62 is the core wire of the covered electric wire 64. In addition, the exposed core wire on the other end side of the covered electric wire 64 is a connecting portion 62b-1 for connection with the round terminal 64a as another component. Further, the cover of the covered electric wire 64 corresponds to the insulator 63 that is partially embedded in the conductive resin portion 11 so as to be interposed between the conductive reinforced resin and the conductor 62 so as to prevent the connecting portion 62b-1 of the conductor 62 from contacting the conductive reinforced resin.

In the composite material structure 6 of the sixth embodiment described above also, galvanic corrosion can be prevented while exposing the part of the conductor 62 embedded in the conductive resin portion 11 as the connecting portion 62b-1, as in the first embodiment and such described above.

Further, in this embodiment, since the insulator 63 is the cover of the covered electric wire 64 whose core wire is the second conductor 62b, providing only the covered electric wire 64 is sufficient and there is no need to form a separate insulator, thus the number of components can be reduced, thus this embodiment is preferable. Further, since the dimension of the boundary between the conductive resin portion 11 and the insulator 63 can be reduced to about the thickness dimension of the covered electric wire 64, a decrease in the strength of the composite material structure 6 due to the embedding of the insulator 63 in the conductive resin portion 11 can be prevented, thus this embodiment is preferable in this respect also.

As a modified example of the sixth embodiment, the covered electric wire 64 joined to the first conductor 12a may be divided into a plurality of covered electric wires according to the required current capacity, thereby reducing size of each of the covered electric wires. The plurality of covered electric wires is arranged in a one-dimensional arrangement in which they are arranged side by side in line, and each end thereof is joined to the first conductor 12a. In this modified example, since size of one covered electric wire is reduced, the conductive resin portion 11 can be thinned by that amount. In another example, a flat cable may be used instead of the plurality of covered electric wires to further thin the conductive resin portion 11.

Next, a composite material structure according to a seventh embodiment will be described with reference to FIG. 10.

Figure 10:
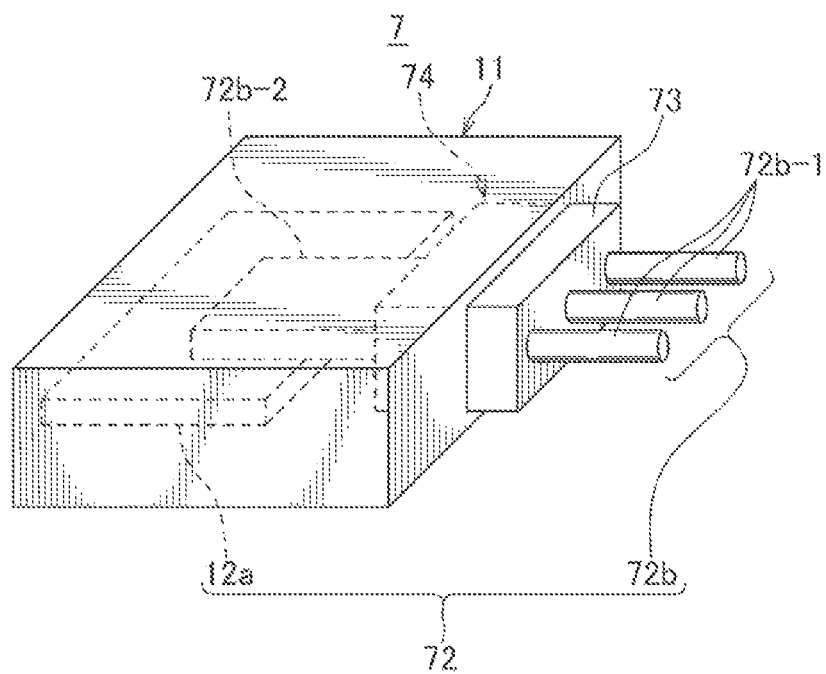
FIG. 10 is a schematic perspective view showing a composite material structure of a seventh embodiment.

FIG. 10 is a schematic perspective view showing the composite material structure of the seventh embodiment. In FIG. 10 also, the components equivalent to the components in the first embodiment shown in FIG. 1 and FIG. 2 are shown with the same reference signs as those in FIG. 1 and FIG. 2, and in the following, duplicate explanations about these equivalent components are omitted.

In the composite material structure 7 of this embodiment, the first conductor 12a embedded in the conductive resin portion 11 is joined, inside the conductive resin portion 11, to a common end 72b-2 for three connector terminals of a connector 74, the common end 72b-2 corresponding to the opposite side to another terminal connecting-side of the connector terminal (i.e., the another terminal connecting-side being a side for connection with another terminal). The connector 74 is arranged such that a connecting side thereof for connection with another connector protrudes from the conductive resin portion 11 with a part of a connector housing remaining inside the conductive resin portion 11, and, at this connecting side, the another terminal connecting-side of the connector terminal is exposed from the connector housing.

In the composite material structure 7 including the connector 74 as described above, the second conductor 72b that together with the first conductor 12a constitutes the conductor 72 corresponds to the three connector terminals that are electrically connected by the common end 72b-2. Further, the another terminal connecting-sides of these three connector terminals are the connecting portions 72b-1 for connection with another terminals as another components. Further, the connector housing of the connector 74 is an insulator 73 that is partially embedded in the conductive resin portion 11 so as to be interposed between the conductive reinforced resin and the conductor 72 so as to prevent the connecting portions 72b-1 of the conductor 72 from contacting the conductive reinforced resin.

In the composite material structure 7 of the seventh embodiment described above also, galvanic corrosion can be prevented while exposing the parts of the conductor 72 embedded in the conductive resin portion 11 as the connecting portions 72b-1, as in the first embodiment and such described above.

Further, in this embodiment, since the insulator 73 is the connector housing of the connector 74 in which the connector terminals are the second conductors 72b, providing only the connector 74 is sufficient and there is no need to form a separate insulator, thus the number of components can be reduced, and thus this embodiment is preferable. Further, since the connector terminal that originally has a connection structure for connection with another terminal as another component is used as the second conductors 72b, another component can be easily connected and disconnected, thus this embodiment is preferable in this respect also.

As a modified example of the seventh embodiment, the number of connector terminals joined to the first conductor 12a may be other than three, e.g., it may be one, two or more than three. In another example, the plurality of connector terminals may be individually joined to the first conductor 12a instead of being put together by the common end 72b-2. In another example, the first conductor 12a may be divided into a plurality of conductors, and the connector terminals may be independently connected to the plurality of conductors, respectively.

Next, a composite material structure according to an eighth embodiment will be described with reference to FIG. 11.

Figure 11:
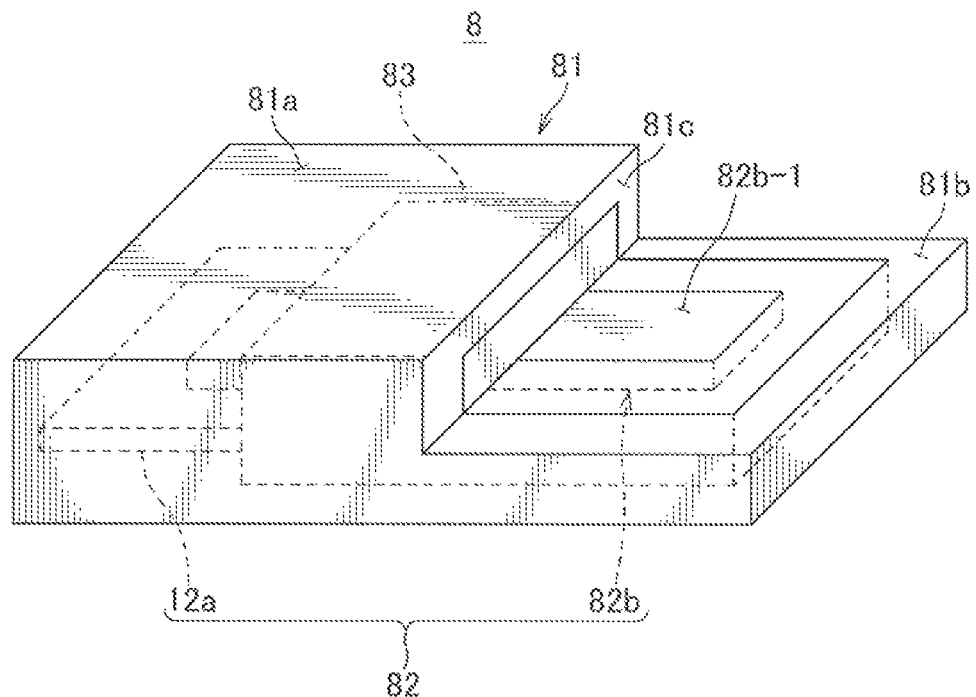
FIG. 11 is a schematic perspective view showing a composite material structure of an eighth embodiment.

FIG. 11 is a schematic perspective view showing the composite material structure of the eighth embodiment. In FIG. 11 also, the components equivalent to the components in the first embodiment shown in FIG. 1 and FIG. 2 are shown with the same reference signs as those in FIG. 1 and FIG. 2, and in the following, duplicate explanations about these equivalent components are omitted.

In the composite material structure 8 of this embodiment, the conductive resin portion 81 includes a step-shaped portion including a first plane 81a, a second plane 81b arranged one step lower from the first plane 81a, and a standing plane 81c connecting the first and second planes. The insulator 83 is formed in the step shape similar to the conductive resin portion 81 and is embedded in the conductive resin portion 81 so that a part of the insulator 83 is exposed from the second plane 81b to the standing plane 81c of the conductive resin portion 81. The second conductor 82b, that together with the first conductor 12a constitutes the conductor 82, includes a connecting portion 82b-1 which is a part further exposed from the part of the insulator 83 exposed from the second plane 81b of the conductive resin portion 81.

In this embodiment, the insulator 83 is formed so that the part thereof is exposed flush with the second plane 81b of the conductive resin portion 81. Further, the second conductor 82b constituting the conductor 82 includes the connecting portion 82b-1 which is the part further exposed in the manner flush with the surface of the part of the insulator 83 exposed from the second plane 81b of the conductive resin portion 81. That is, in this embodiment, the second plane 81b of the conductive resin portion 81, the exposed surface of the insulator 83 exposed from the second plane 81b, and the surface of the connecting portion 82b-1 are flush with each other.

Next, two connection examples of connecting another component to the connecting portion 82b-1 of the conductor 82 of the eighth embodiment described above will be explained.

Figure 12:
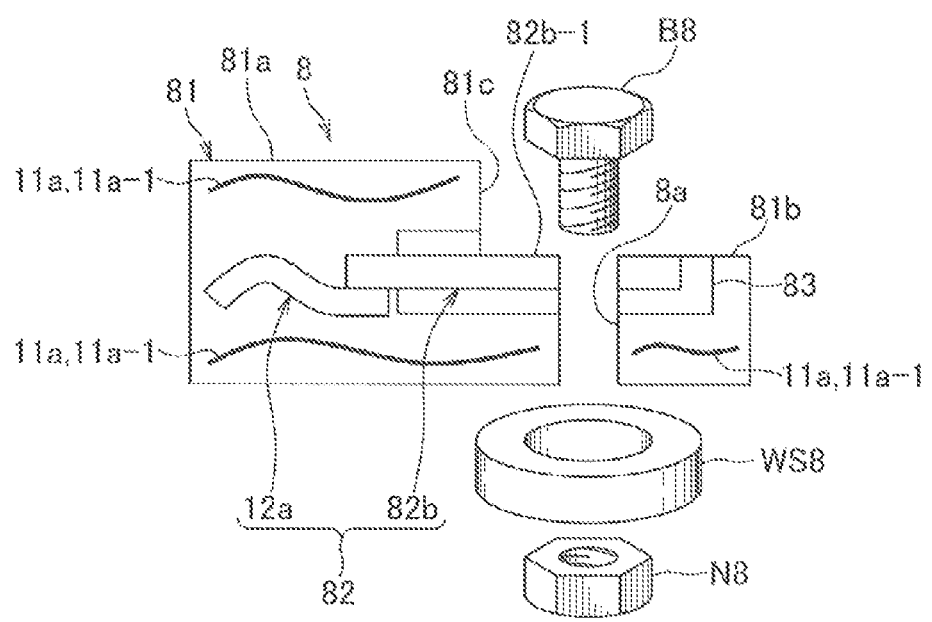
FIG. 12 is a schematic cross-sectional view showing a first connection example with respect to a connecting portion of a conductor of the eighth embodiment.

FIG. 12 is a schematic cross-sectional view illustrating a first connection example with respect to the connecting portion of the conductor of the eighth embodiment.

In the first connection example, a part of the composite material structure 8 that includes the connecting portion 82b-1 of the second conductor 82b constituting the conductor 82 together with the first conductor 12a, is provided with a through hole 8a for connection. This through hole 8a is provided to penetrate through the connecting portion 82b-1, the insulator 83 located beneath, and the conductive resin portion 81 located further beneath and including a conductive fiber sheet 11a-1. Another component is fastened and connected to the connecting portion 82b-1 by a bolt B8 penetrating the through hole 8a, a nut N8 screwed to the bolt B8, and an insulating washer WS8 interposed between the nut N8 and the conductive resin portion 81. Examples of the another component in this example include a bus bar formed of a metal plate, an electric wire including, at its end, a connecting component such as a round terminal that can be fastened using the bolt B8, the nut N8 and the insulating washer WS8, and the like.

Further, as a modified example of the first connection example, for example, a screw hole in which the bolt B8 can be screwed can be provided in place of the through hole 8a, or a connector terminal including a terminal shape that enables attachment and detachment of the another component to the connecting portion 82b-1 can be provided as an electrode.

Figure 13:
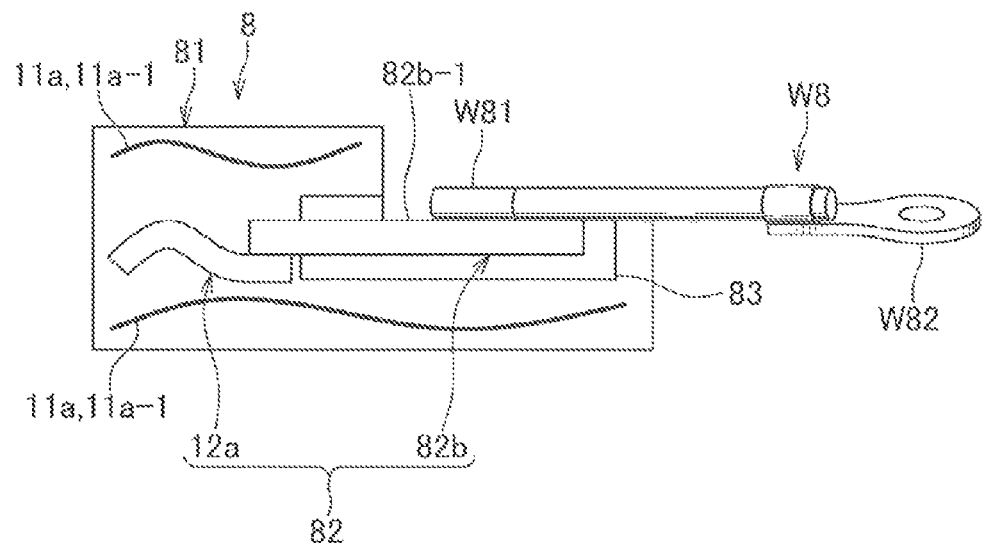
FIG. 13 is a schematic cross-sectional view showing a second connection example with respect to a connecting portion of a conductor of the eighth embodiment.

FIG. 13 is a schematic cross-sectional view illustrating a second connection example with respect to the connecting portion of the conductor of the eighth embodiment.

In the second connection example, an exposed core wire W81 on one end side of an electric wire with terminal W8 as another component is soldered and fixed to the connecting portion 82b-1 of the second conductor 82b of the composite material structure 8 that together with the first conductor 12a constitutes the conductor 82. A round terminal W82 for connection with an electric/electronic device is crimped to the other end side of the electric wire with terminal W8.

As a modified example of the second connection example, instead of the electric wire with terminal W8, one end of a connector terminal of a connector may be soldered and fixed, for example. In another example, as the connecting method for connection with respect to the connecting portion 82b-1, ultrasonic welding, crimping or the like can be used in place of soldering.

In the composite material structure 8 of the eighth embodiment described above also, galvanic corrosion can be prevented while exposing the part of the conductor 82 embedded in the conductive resin portion 81 as the connecting portion 82b-1, as in the first embodiment and such described above.

In addition, in this embodiment, the insulator 83 is exposed at the second plane 81b of the step shape of the conductive resin portion 81 that is one-step lower, which is an easy-to-access part, and the connecting portion 82b-1 of the conductor 82 is provided so as to be further exposed from the exposed part of the insulator 83. With the connecting portion 82b-1 placed in such position, attachment of an electric wire and the like to the connecting portion 82b-1, for example, can be performed with good workability.

Further, in this embodiment, the insulator 83 is formed such that a part thereof is exposed flush with the surface such as the second plane 81b and the standing plane 81c of the conductive resin portion 81. Further, the conductor 82 includes the connecting portion 82b-1 that is the part exposed from the part of the insulator 83 exposed from the second plane 81b. According to this configuration, since the insulator 83 is flush with the surface of the conductive resin portion 81 without protruding therefrom, it is possible to reduce the size of the composite material structure 8 for that amount.

Further, in this embodiment, the conductor 82 includes the connecting portion 82b-1 that is the part exposed in a manner flush with the surface of the part of the insulator 83 exposed from the second plane 81b of the conductive resin portion 81. According to this configuration, since the connecting portion 82b-1 is flush with the surface of the insulator 83 without protruding therefrom, it is possible to reduce the size of the composite material structure 8 for that amount. Further, since the insulator 83 including the surface flush with the connecting portion 82b-1 can support the entire connecting portion 82b-1, it is possible to improve the mechanical strength of the connecting portion 82b-1 against an external force. It is further possible to reduce the thickness of the connecting portion 82b-1 of the conductor 82 in view of the improvement in the mechanical strength thereof, and it is further possible to use a conductive material that is excellent in electrical property but somewhat inferior in mechanical strength as a material for forming the connecting portion 82b-1 of the conductor 82.

Next, a composite material structure according to a ninth embodiment will be described with reference to FIG. 14.

Figure 14:
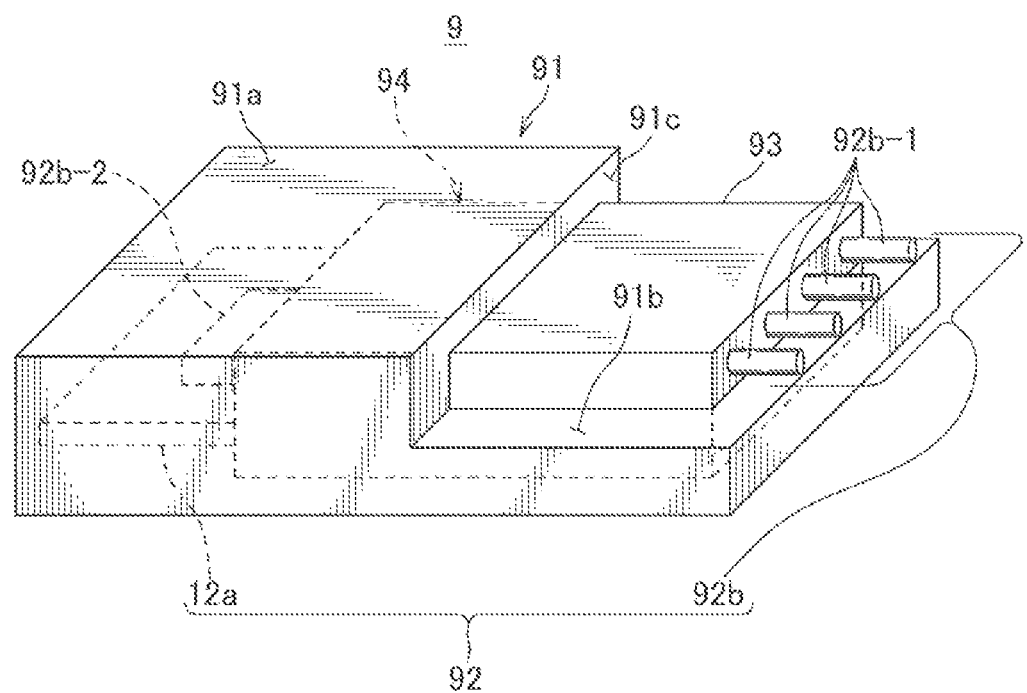
FIG. 14 is a schematic perspective view showing a composite material structure of a ninth embodiment.

FIG. 14 shows a schematic perspective view of the composite material structure of ninth embodiment. In FIG. 14 also, the components equivalent to those in the first embodiment shown in FIG. 1 and FIG. 2 are shown with the same reference signs as those in FIG. 1 and FIG. 2, and in the following, duplicate explanations about these equivalent components are omitted.

In the composite material structure 9 of this embodiment, the conductive resin portion 91 includes a step-shaped portion including a first plane 91a, a second plane 91b and a standing plane 91c similar to the eighth embodiment. A connector 94 is embedded in the conductive resin portion 91 such that a part of the connector 94 is exposed across the second plane 91b to the standing plane 91c. A common end 92b-2 of four connector terminals of the connector 94, which is on the opposite side to the other terminal-connecting side of the connector terminal, is joined to the first conductor 12a inside the conductive resin portion 91. A connecting side of the connector 94 for connection with another connector is exposed from the conductive resin portion 91 with a part of a connector housing remaining inside the conductive resin portion 91, and, at this connecting side, the another terminal connecting-side of the connector terminal is exposed from the connector housing.

In the composite material structure 9 including the connector 94 as described above, the second conductor 92b that together with the first conductor 12a constitutes the conductor 92 corresponds to the four connector terminals that are electrically connected by the common end 92b-2. Further, the another terminal connection-side of these four connector terminals are the connecting portions 92b-1 for connection with another terminals as another components. Further, the connector housing of the connector 94 is an insulator 93 that is partially embedded in the conductive resin portion 91 so as to be interposed between the conductive reinforced resin and the conductor 92 so that the connecting portions 92b-1 of the conductor 92 do not contact with the conductive reinforced resin.

In the composite material structure 9 of the ninth embodiment described above also, galvanic corrosion can be prevented while exposing the part of the conductor 92 embedded in the conductive resin portion 91 as the connecting portion 92b-1, as in the first embodiment and such described above.

Further, similar to the seventh embodiment described above, in this embodiment also, the number of components can be reduced since the insulator 93 is the connector housing of the connector 94, thus this embodiment is preferable. Further, similar to the seventh embodiment described above, since the connector terminal is used as the second conductor 92b, it is easy to connect and disconnect another component, thus this embodiment is preferable in this respect also. As a modified example of the ninth embodiment, similar to the seventh embodiment described above, the number of connector terminals joined to the first conductor 12a may be other than four, e.g., it may be one, two, three or more than four. In another example, the plurality of connector terminals may be individually joined to the first conductor 12a instead of being put together by the common end 92b-2. In another example, the first conductor 12a may be divided into a plurality of conductors, and the connector terminals may be independently connected to the plurality of conductors, respectively.

Next, a composite material structure according to a tenth embodiment will be described with reference to FIG. 15 and FIG. 16.

Figure 15:
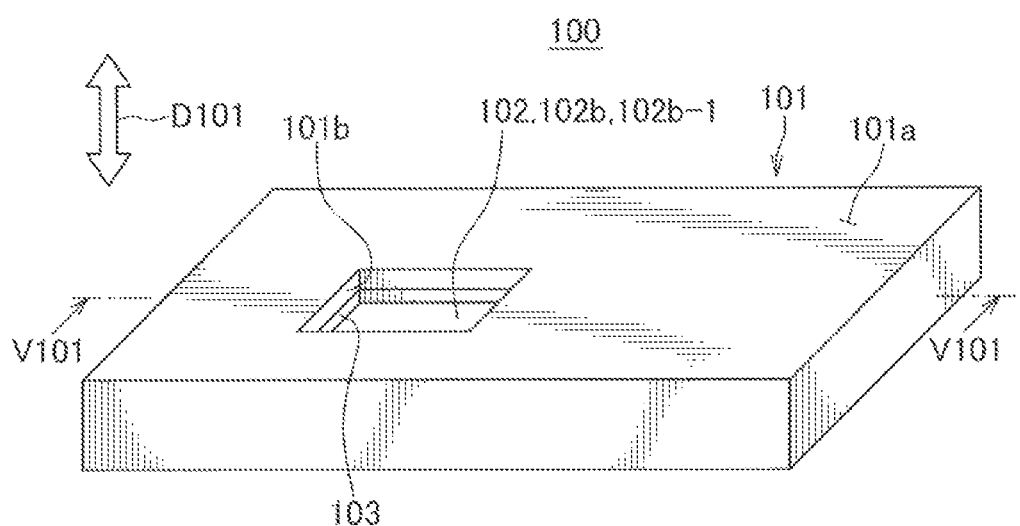
FIG. 15 is a schematic perspective view showing a composite material structure of a tenth embodiment.
Figure 16:
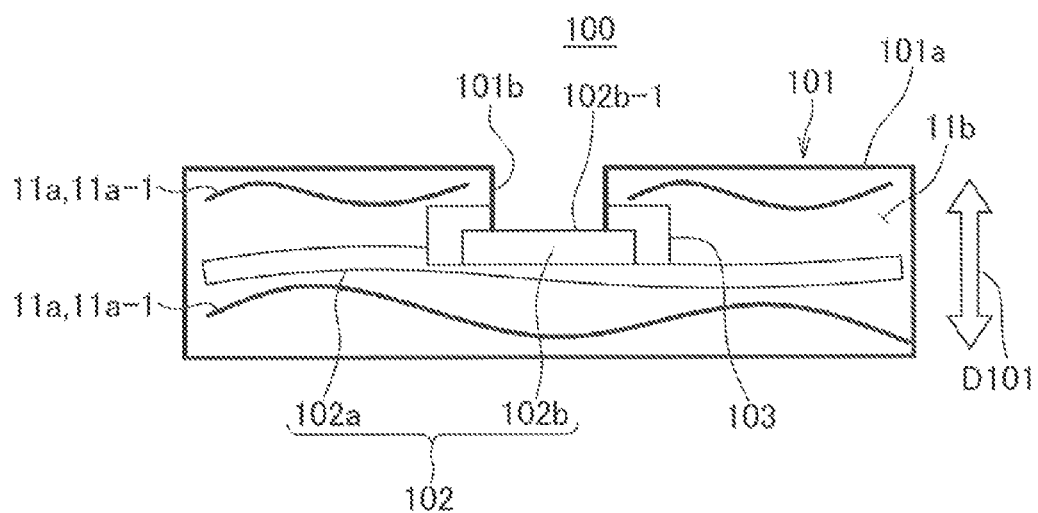
FIG. 16 is a schematic cross-sectional view taken along the line V101-V101 in FIG. 15, showing an internal configuration of the composite material structure shown in FIG. 15.

FIG. 15 is a schematic perspective view showing a composite material structure of the tenth embodiment, and FIG. 16 is a schematic cross-sectional view taken along line V101-V101 in FIG. 15, showing the internal configuration of the composite material structure shown in FIG. 15. In FIG. 15 and FIG. 16 also, the components equivalent to those in the first embodiment shown in FIG. 1 and FIG. 2 are shown with the same reference signs as in FIG. 1 and FIG. 2, and in the following, duplicate explanations about these equivalent components are omitted.

In a composite material structure 100 of this embodiment, a quadrangular cylinder-shaped recess 101b is provided at a wide surface 101a of a conductive resin portion 101 formed in a flat rectangular parallelepiped. Similar to the first embodiment described above, the conductive resin portion 101 is formed of the conductive reinforced resin in which the stack of the conductive fiber sheets 11a-1 formed of the conductive fibers 11a is impregnated with the molten base material 11b. The recess 101b is formed through a part of the conductive fiber sheet 11a-1. The shape of the recess 101b is not limited to a quadrangular cylinder-like shape, and it may be a polygonal cylinder-like shape other than a quadrangular cylinder-like shape, or it may be a circular cylinder-like shape, as long as it is cylinder-like shape.

The conductor 102 in the composite material structure 100 includes a first conductor 102a and a second conductor 102b. The first conductor 102a is entirely embedded in the conductive resin portion 101 so as to be sandwiched between the conductive fiber sheets 11a-1 of the stack of the conductive fiber sheets 11a-1. The second conductor 102b is also formed in a quadrangular plate shape, and is placed near a center of the first conductor 102a and joined thereto, with a part of the second conductor 102b exposed as a connecting portion 102b-1 at a bottom of the recess 101b in the conductive resin portion 101. Thus, the conductor 102 is embedded in the conductive resin portion 101 such that a part of the second conductor 102b is exposed as the connecting portion 102b-1 so as to form the bottom of the recess 101b. The shape of the second conductor 102b of the conductor 102 is not limited to a quadrangular plate-like shape. The shape of the second conductor 102b may be another shape such as a circular plate-like shape, as long as a part of the second conductor 102b can constitute the bottom of the recess 101b in the insulating resin portion 101. As a modified example of the conductor 102, the second conductor 102b may be omitted, and a part of the first conductor 102a may be exposed at the bottom of the recess 101b as an alternative to the second conductor 102b.

The insulator 103 of the composite material structure 100 is embedded in the conductive resin portion 101 so as to be interposed between the conductive reinforced resin and the second conductor 102b with a part of the insulator 103 exposed at the bottom side, in a depth direction D101 of the recess 101b, of an inner circumferential surface of the recess 101b. The insulator 103 is interposed between the conductive reinforced resin and the second conductor 102b so as to cover an outer circumferential portion of the second conductor 102b over the entire circumference, thereby preventing the connecting portion 102b-1 of the second conductor 102b from contacting the conductive reinforced resin. Herein, the insulator 103 is not limited to that partially exposed at the bottom side of the inner circumferential surface of the recess 101b, and it may be exposed at the entire circumferential surface of the inner circumferential surface of the recess 101b, i.e., the inner circumferential surface of the insulator 103 may constitute the recess 101b itself.

Next, two connection examples of connecting another component to the connecting portion 102b-1 of the conductor 102 of the tenth embodiment described above will be described.

Figure 17:
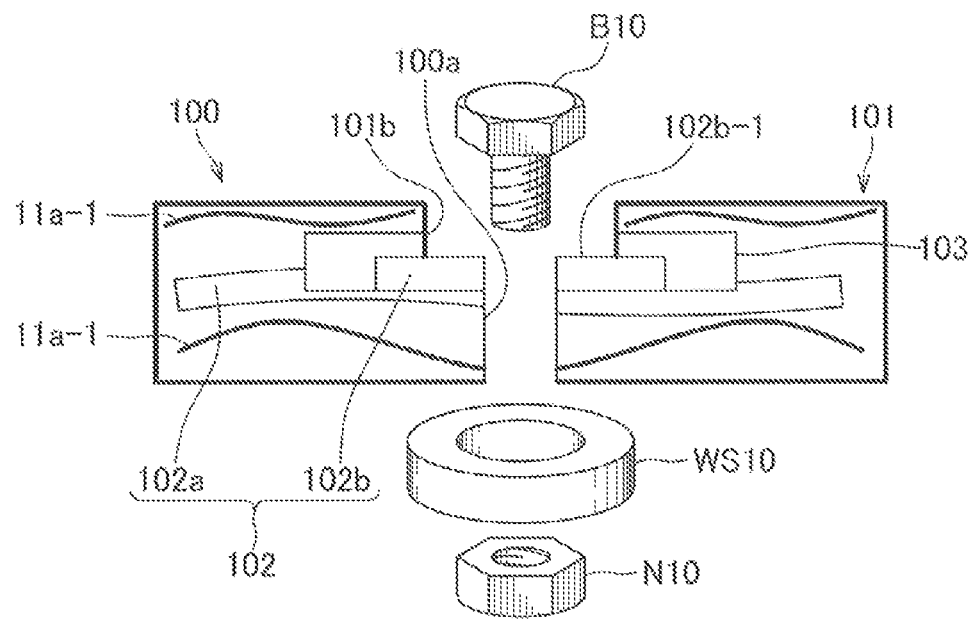
FIG. 17 is a schematic cross-sectional view showing a first connection example with respect to a connecting portion of a conductor of the tenth embodiment.

FIG. 17 is a schematic cross-sectional view illustrating a first connection example with respect to the connecting portion of the conductor of the tenth embodiment.

In the first connection example, a through hole 100a for connection is provided at a part of the composite material structure 100 where the connecting portion 102b-1 of the second conductor 102b constituting the conductor 102 is provided. This through hole 100a is provided to penetrate through the connecting portion 102b-1, the first conductor 102a located beneath, and the conductive resin portion 101 located further beneath and including the conductive fiber sheet 11a-1. Another component is to be fastened and connected to the connecting portion 102b-1 by a bolt B10 inserted through the through hole 100a, a nut N10 screwed to the bolt B10 and an insulating washer WS10 interposed between the nut N10 and the conductive resin portion 101. Examples of the another component in this example include a bus bar formed of a metal plate, an electric wire including, at its end, a connecting component such as a round terminal that can be fastened using the bolt B10, the nut N10 and the washer WS10, and the like.

As a modified example of the first connection example, a screw hole in which the bolt B10 can be screwed can be provided in place of the through hole 100a, or a connector terminal including a terminal shape that enables attachment and detachment of the another component to the connecting portion 102b-1 can be provided as an electrode.

Figure 18:
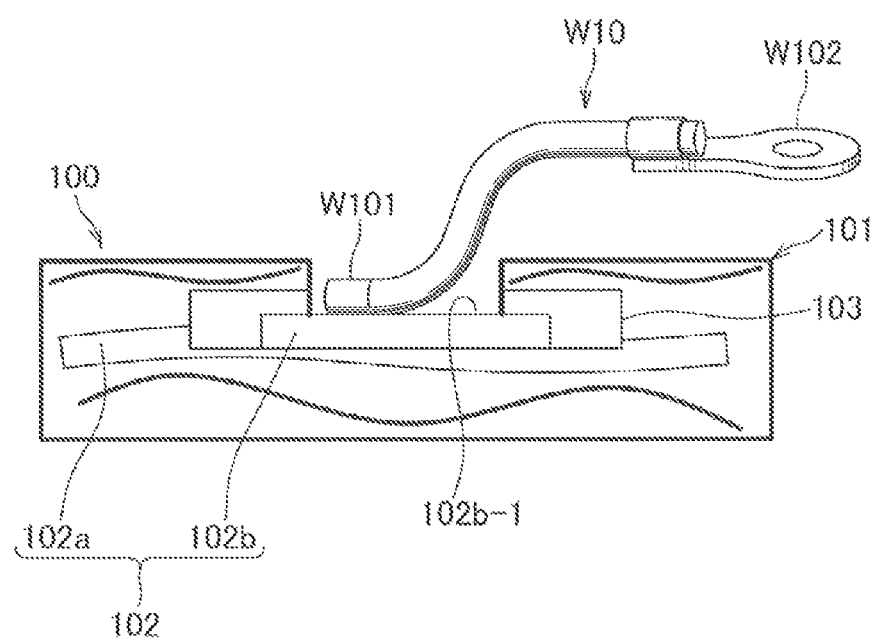
FIG. 18 is a schematic cross-sectional view showing a second connection example with respect to the connecting portion of the conductor of the tenth embodiment.

FIG. 18 is a schematic cross-sectional view illustrating a second connection example with respect to the connecting portion of the conductor of the tenth embodiment.

In the second connection example, an exposed core wire W101 on one end side of an electric wire with terminal W10 as another component is soldered and fixed to the connecting portion 102b-1 of the second conductor 102b that together with the first conductor 102a constitutes the conductor 102 of the composite material structure 100. A round terminal W102 for connection with an electric/electronic device is crimped to the other end side of the electric wire with terminal W10.

As a modified example of the second connection example, instead of the electric wire with terminal W10, one end of a connector terminal of a connector may be soldered and fixed, for example. In another example, as the connecting method for connection with respect to the connecting portion 102b-1, ultrasonic welding, crimping or the like can be used in place of soldering.

In the composite material structure 100 of the tenth embodiment described above also, galvanic corrosion can be prevented while exposing the part of the conductor 102 embedded in the conductive resin portion 101 as the connecting portion 102b-1, as in the first embodiment and such described above.

Further, in this embodiment, the insulator 103 which is partially exposed at the inner circumferential surface of the recess 101b in the conductive resin portion 101 can support the peripheral portion of the connecting portion 102b-1 exposed at the bottom of the recess 101b. With this support of the peripheral portion by the insulator 103, it is possible to improve the mechanical strength of the connecting portion 102b-1 against an external force. It is further possible to reduce the thickness of the connecting portion 102b-1 of the conductor 102 in view of the improvement in the mechanical strength thereof, and it is further possible to use a conductive material that is excellent in electrical property but somewhat inferior in mechanical strength as a material for forming the connecting portion 102b-1 of the conductor 102.

Next, a composite material structure according to an eleventh embodiment will be described with reference to FIG. 19 and FIG. 20.

Figure 19:
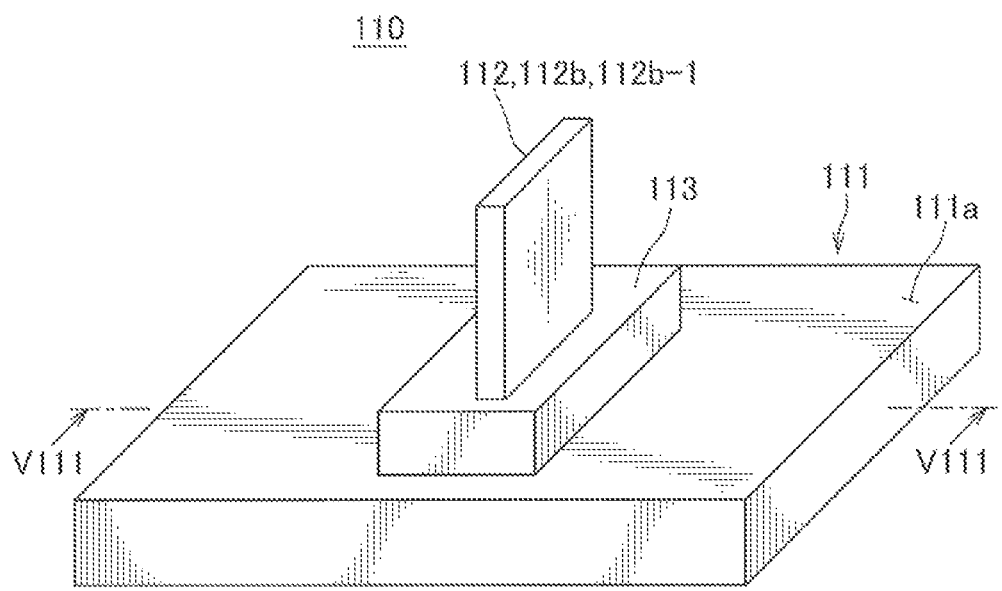
FIG. 19 is a schematic perspective view showing a composite material structure of an eleventh embodiment.
Figure 20:
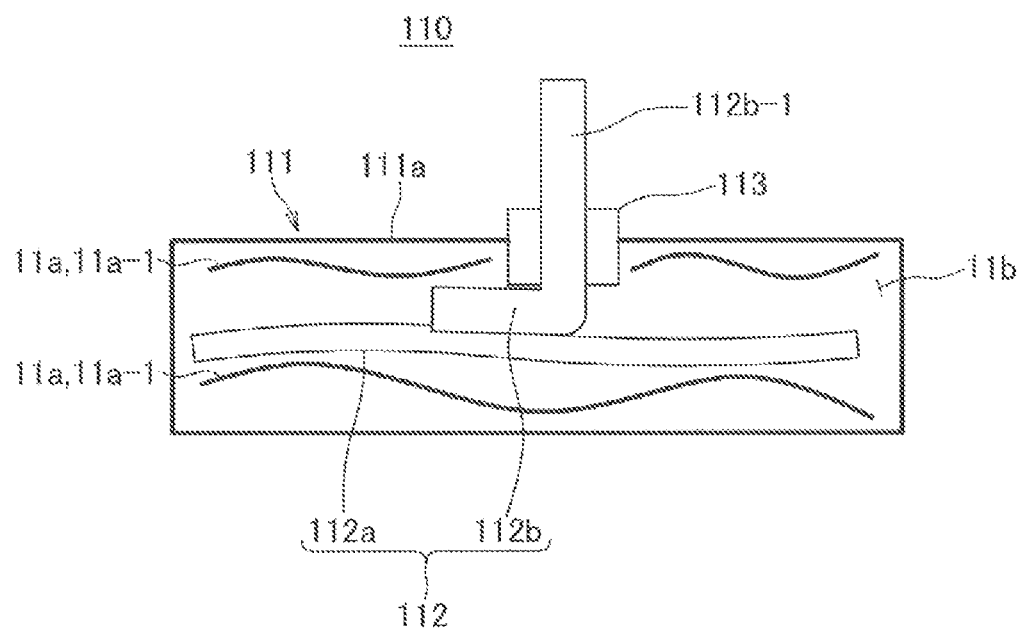
FIG. 20 is a schematic cross-sectional view taken along the line V111-V111 in FIG. 19 showing an internal configuration of the composite material structure shown in FIG. 19.

FIG. 19 is a schematic perspective view showing a composite material structure of the eleventh embodiment, FIG. 20 is a schematic cross-sectional view taken along line V111-V111 in FIG. 19, showing the internal configuration of the composite material structure shown in FIG. 19. In FIG. 19 and FIG. 20 also, the components equivalent to those in the first embodiment shown in FIG. 1 and FIG. 2 are also shown with the same reference signs as in FIG. 1 and FIG. 2, and duplicate explanations about these equivalent components are omitted.

In the composite material structure 110 of this embodiment, a rectangular parallelepiped-shaped insulator 113 protrudes and is exposed from substantially the center of a wide surface 111a of a conductive resin portion 111 formed in a flat rectangular parallelepiped. A quadrangular plate-shaped connecting portion 112b-1 of a conductor 112 protrudes and is exposed from one end surface of the insulator 113. Similar to the first embodiment described above, the conductive resin portion 111 is formed of a conductive reinforced resin in which the stack of the conductive fiber sheets 11a-1 formed of the conductive fibers 11a is impregnated with the molten base material 11b.

The conductor 112 of the composite material structure 110 includes a first conductor 112a and a second conductor 112b. The first conductor 112a is entirely embedded in the conductive resin portion 111 so as to be sandwiched between the conductive fiber sheets 11a-1 of the stack of the conductive fiber sheets 11 a-1. The second conductor 112b has a shape in which a quadrangular plate-like metal plate is bent so as to have an L-shaped cross-section, and a part of the second conductor 112b corresponding to a transverse bar of the L-shape is placed near the center of first conductor 112a and joined thereto. A part of the second conductor 112b corresponding to a vertical bar of the L-shape penetrates through the insulator 113 and is partially protruding and exposed from the one end surface of the insulator 113 as a quadrangular plate-shaped connecting portion 112b-1. Herein, the shape of the second conductor 112b of the conductor 112 is not limited to the shape including the L-shaped cross section. The shape of the second conductor 112b is not limited to a specific shape as long as it is capable of being placed on and joined to the first conductor 112a and a part of the second conductor 112b can penetrate through and protrude from the insulator 113, and, for example, it may be a shape including a Z-shaped, T-shaped, or C-shaped cross section.

The insulator 113 is embedded in the conductive resin portion 111 so as to be interposed between the conductive reinforced resin and the second conductor 112b, with the second conductor 112b penetrating therethrough and with a part thereof protruding and being exposed from the conductive resin portion 111.

Next, two connection examples of connecting another component to the connecting portion 112b-1 of the conductor 112 of the eleventh embodiment described above will be described.

Figure 21:
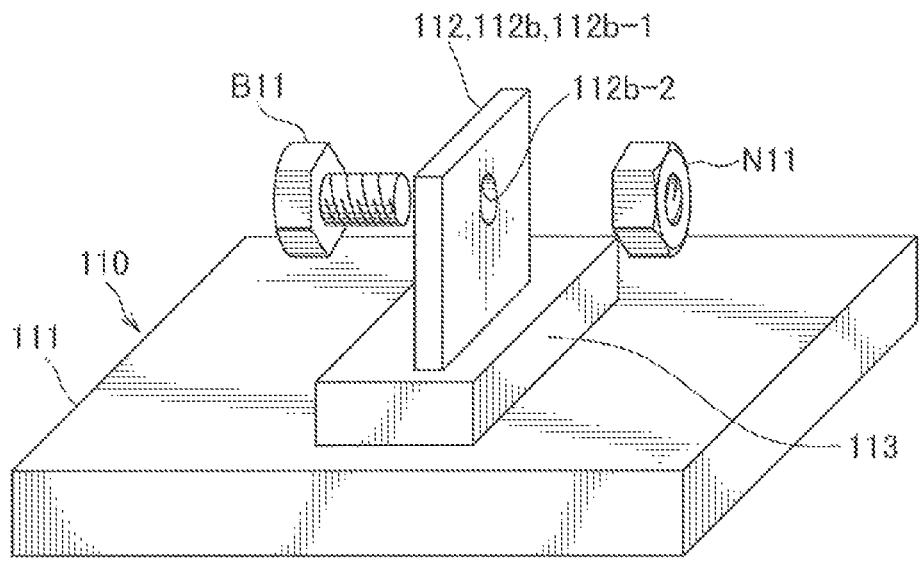
FIG. 21 is a schematic perspective view showing a first connection example with respect to a connecting portion of a conductor of the eleventh embodiment.

FIG. 21 is a schematic perspective view illustrating a first connection example with respect to the connecting portion of the conductor of the eleventh embodiment.

In the first connection example, a through hole 112b-2 for connection is provided through the connecting portion 112b-1 of the second conductor 112b constituting the conductor 112 of the composite material structure 110. Another component is to be fastened and connected to the connecting portion 112b-1 by a bolt B11 inserted through the through hole 112b-2 and a nut N11 screwed to the bolt B11. Examples of the another component in this example include a bus bar formed of a metal plate, an electric wire including, at its end, a connecting component such as a round terminal that can be fastened using the bolt B11 and the nut N11, and the like.

As a modified example of the first connection example, a screw hole in which the bolt B11 can be screwed can be provided in place of the through hole 112b-2, or a connector terminal including a terminal shape that enables attachment and detachment of the another component to the connecting portion 112b-1 can be provided as an electrode.

Figure 22:
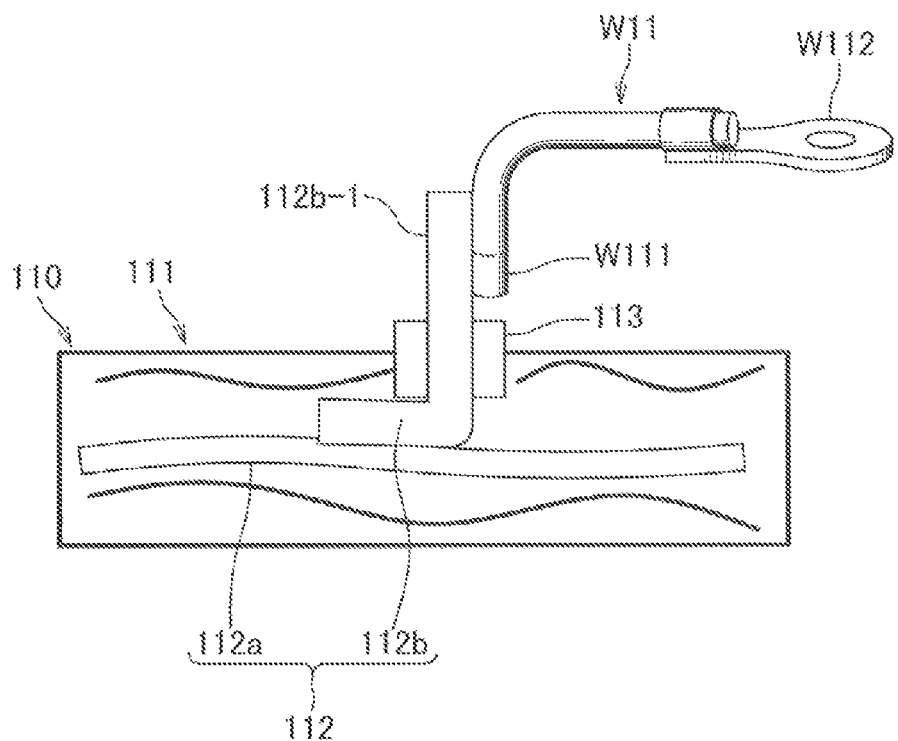
FIG. 22 is a schematic cross-sectional view showing a second connection example with respect to the connecting portion of the conductor of the eleventh embodiment.

FIG. 22 is a schematic cross-sectional view illustrating a second connection example with respect to the connecting portion of the conductor of the eleventh embodiment.

In the second connection example, an exposed core wire W111 on one end side of an electric wire with terminal W11 as another component is soldered and fixed to the connecting portion 112b-1 of the second conductor 112b that together with the first conductor 112a constitutes the conductor 112 of the composite material structure 110. A round terminal W112 for connection with an electric/electronic device is crimped to the other end side of the electric wire with terminal W11.

As a modified example of the second connection example, instead of the electric wire with terminal W11, one end of a connector terminal of a connector may be soldered and fixed, for example. In another example, as the connecting method for connection with respect to the connecting portion 112b-1, ultrasonic welding, crimping or the like can be used in place of soldering.

In the composite material structure 110 of the eleventh embodiment described above also, galvanic corrosion can be prevented while exposing the part of the conductor 112 embedded in the conductive resin portion 111 as the connecting portion 112b-1, as in the first embodiment and such described above.

Further, in this embodiment, a part of the insulator 113 protrudes from the surface of the conductive resin portion 111, and from this protruded part, the connecting portion 112b-1 of the conductor 112 is exposed. According to this configuration, the reliability of the prevention of the contact between the connecting portion 112b-1 and the conductive reinforced resin is improved, thereby further preventing galvanic corrosion.

Further, in this embodiment, the part of the conductor 112 protruding from the part of the insulator 113 exposed from the conductive resin portion 111, is the connecting portion 112b-1. According to this configuration, since the connecting portion 112b-1 protrudes from the insulator 113, attachment of an electric wire or the like with respect to the connecting portion 112b-1, for example, can be performed with good workability.

Next, a composite material structure according to a twelfth embodiment will be described with reference to FIG. 23 and FIG. 24.

Figure 23:
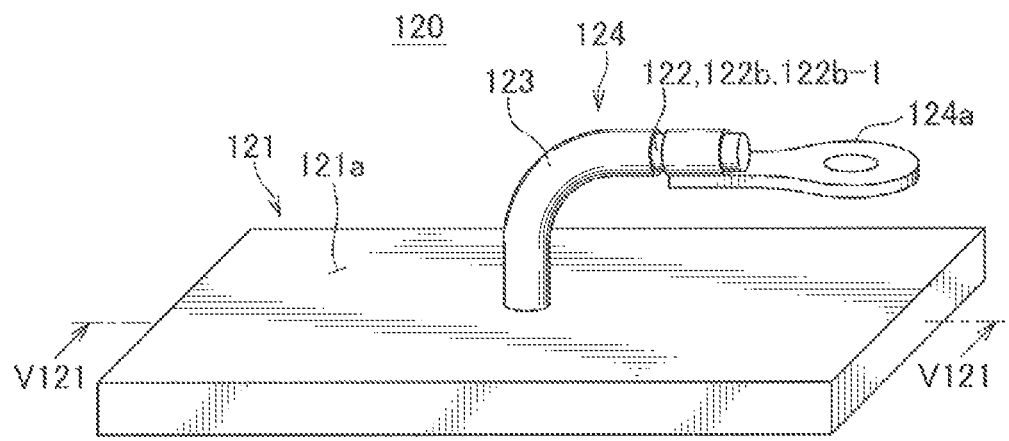
FIG. 23 is a schematic perspective view showing a composite material structure of a twelfth embodiment.
Figure 24:
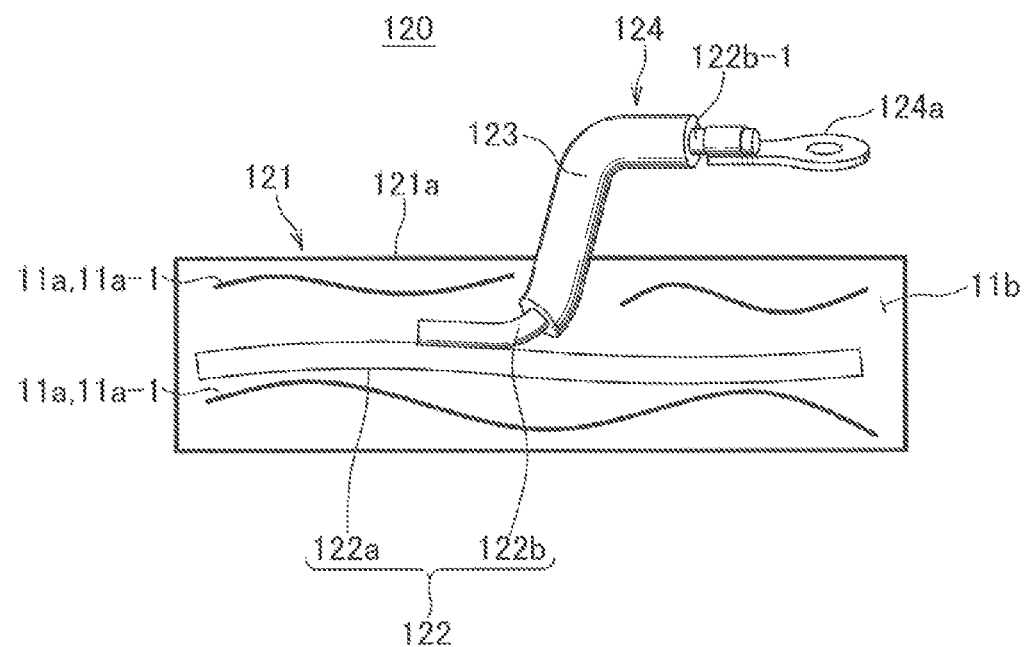
FIG. 24 is a schematic cross-sectional view taken along the line V121-V121 in FIG. 23 showing an internal configuration of the composite material structure shown in FIG. 23.

FIG. 23 is a schematic perspective view showing a composite material structure of the twelfth embodiment, and FIG. 24 is a schematic cross-sectional view taken along line V121-V121 in FIG. 23, showing the internal configuration of the composite material structure shown in FIG. 23. In FIG. 23 and FIG. 24 also, the components equivalent to those in the first embodiment shown in FIG. 1 and FIG. 2 are shown with the same reference signs as in FIG. 1 and FIG. 2, and duplicate explanations about these equivalent components are omitted.

In the composite material structure 120 of this embodiment, a covered electric wire 124 protrudes and is exposed from substantially the center of a wide surface 121a of a conductive resin portion 121 formed in a flat rectangular parallelepiped. Similar to the first embodiment described above, the conductive resin portion 121 is formed of a conductive reinforced resin in which the stack of the conductive fiber sheets 11a-1 formed of the conductive fibers 11a is impregnated with the molten base material 11b. One end of a core wire of the covered electric wire 124 is joined to the first conductor 122a embedded in the conductive resin portion 121 inside the conductive resin portion 121. Examples of the joining method include soldering, ultrasonic welding, crimping and the like. The other end side of the covered electric wire 124 protrudes from the conductive resin portion 121 with a part of the cover remaining inside the conductive resin portion 121, and a part of the core wire is exposed at the other end side. Another component which is a round terminal 124a for connection with an electric/electronic device, is crimped and connected to this exposed core wire.

In the composite material structure 120 including the covered electric wire 124 as described above, the second conductor 122b that together with the first conductor 122a constitutes the conductor 122 is the core wire of the covered electric wire 124. Further, the exposed core wire on the other end side of the covered electric wire 124 is the connecting portion 122b-1 for connection with the round terminal 124a as the another component. Further, the cover of the covered electric wire 124 is an insulator 123 that is partially embedded in the conductive resin portion 121 with the connecting portion 122b-1 of the conductor 122 interposed between the conductive reinforced resin and the conductor 122 so as to prevent the connecting portion 122b-1 from contacting the conductive reinforced resin.

In the composite material structure 120 of the twelfth embodiment described above also, galvanic corrosion can be prevented while exposing the part of the conductor 122 embedded in the conductive resin portion 121 as the connecting portion 122b-1, as in the first embodiment and such described above.

Further, in this embodiment, since the insulator 123 is the cover of the covered electric wire 124 whose core wire is the second conductor 122b, providing only the covered electric wire 124 is sufficient and there is no need to form a separate insulator, thus the number of components can be reduced, thus this embodiment is preferable. Further, since the dimension of the boundary between the conductive resin portion 121 and the insulator 123 can be reduced to about the thickness dimension of the covered electric wire 124, a decrease in the strength of the composite material structure 120 due to the embedding of the insulator 123 in the conductive resin portion 121 can be prevented, thus this embodiment is preferable in this respect also.

As a modified example of the twelfth embodiment, the covered electric wire 124 joined to the first conductor 122a may be divided into a plurality of covered electric wires in accordance with a required current capacity to reduce size of each of the covered electric wires. The plurality of covered electric wires is arranged in a one-dimensional arrangement in which they are arranged side by side in line, and each end thereof is joined to the first conductor 122a. In this modified example, since size of one covered electric wire is reduced, the conductive resin portion 121 can be thinned by that amount. In another example, a flat cable may be used instead of the plurality of covered electric wires to further thin the conductive resin portion 121.

Next, a composite material structure according to a thirteenth embodiment will be described with reference to FIG. 25 and FIG. 26.

Figure 25:
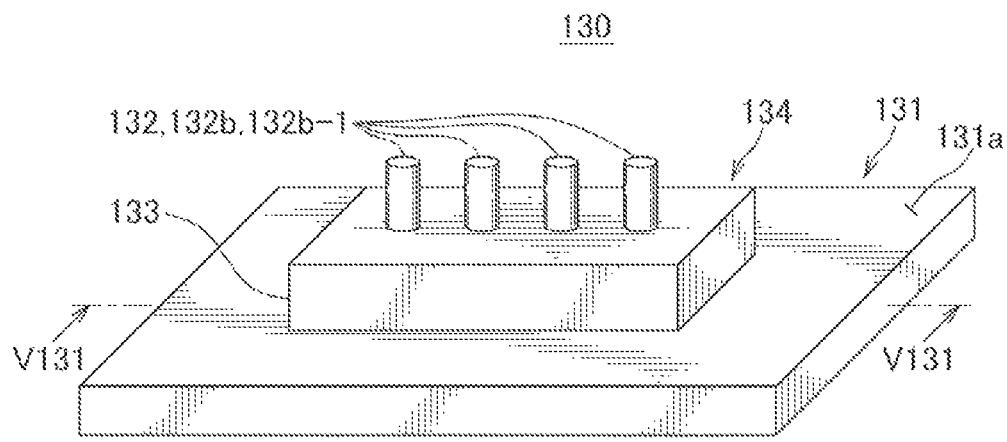
FIG. 25 is a schematic perspective view showing a composite material structure of a thirteenth embodiment.
Figure 26:
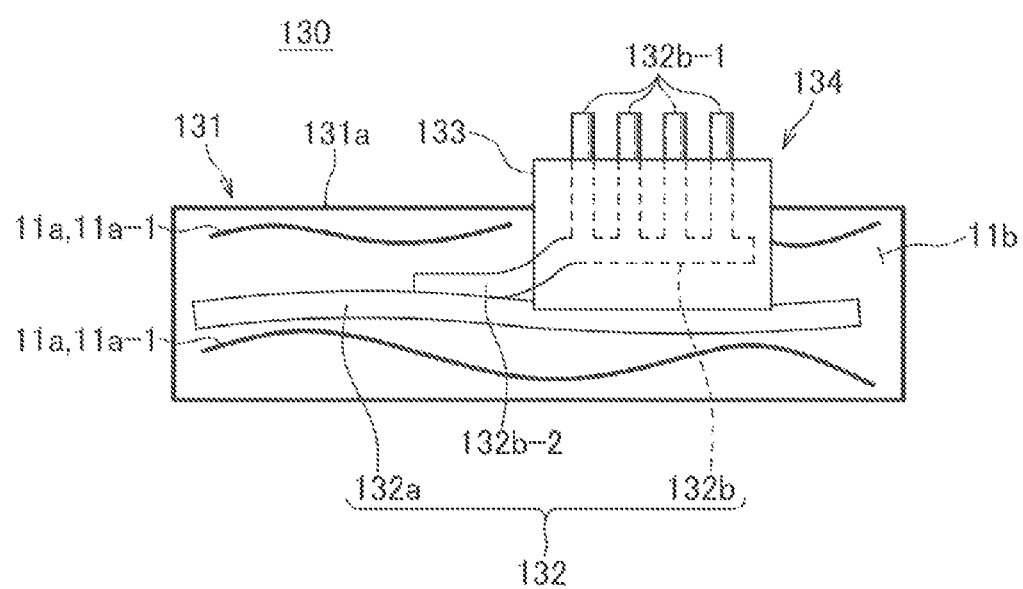
FIG. 26 is a schematic cross-sectional view taken along the line V131-V131 in FIG. 25 showing an internal configuration of the composite material structure shown in FIG. 25.

FIG. 25 is a schematic perspective view showing a composite material structure of a thirteenth embodiment, and FIG. 26 is a schematic cross-sectional view taken along line V131-V131 in FIG. 25, showing the internal configuration of the composite material structure shown in FIG. 25. In FIG. 25 and FIG. 26, the components equivalent to those in the first embodiment shown in FIG. 1 and FIG. 2 are also shown with the same reference signs as in FIG. 1 and FIG. 2, and in the following, duplicate explanations about these equivalent components are omitted.

In the composite material structure 130 of this embodiment, a connector 134 protrudes and is exposed from substantially the center of a wide surface 131a of a conductive resin portion 131 formed in a flat rectangular parallelepiped. Similar to the first embodiment described above, the conductive resin portion 131 is formed of a conductive reinforced resin in which the stack of the conductive fiber sheets 11a-1 formed of the conductive fibers 11a is impregnated with the molten base material 11b. A first conductor 132a embedded in the conductive resin portion 131 is joined, inside the conductive resin portion 131, to a common end 132b-2 for four connector terminals of the connector 134, the common end 132b-2 corresponding to the opposite side to another terminal connecting-side of the connector terminal (i.e., the another terminal connecting-side being for connection with another terminal). The connector 134 is arranged such that a connecting side thereof for connection with another connector protrudes from the conductive resin portion 131 with a part of a connector housing remaining inside the conductive resin portion 131, and, at this connecting side, the another terminal connecting-side of the connector terminal is exposed from the connector housing.

In the composite material structure 130 including the connector 134 as described above, the second conductor 132b that together with the first conductor 132a constitutes the conductor 132 corresponds to the four connector terminals electrically connected by the common end 132b-2. Further, the another terminal connecting-sides of these four connector terminals are the connecting portions 132b-1 for connection with another terminals as another components. Further, the connector housing of the connector 134 is the insulator 133 partially embedded in the conductive resin portion 131 so as to be interposed between the conductive reinforced resin and the conductor 132 so as to prevent the connecting portion 132b-1 of the conductor 132 from contacting the conductive reinforced resin.

In the composite material structure 130 of the thirteenth embodiment described above also, galvanic corrosion can be prevented while exposing the part of the conductor 132 embedded in the conductive resin portion 131 as the connecting portion 132b-1, as in the first embodiment and such described above.

Further, in this embodiment, since the insulator 133 is the connector housing of the connector 134 including the connector terminal being the second conductor 132b, providing the connector 134 is sufficient and there is no need to form a separate insulator, thus the number of components can be reduced, thus this embodiment is preferable. Further, since the connector terminal that originally has a connection structure for connection with another terminal as another component is used as the second conductor 132*b*, another component can be easily connected and disconnected, thus this embodiment is preferable in this respect also.

As a modified example of the thirteenth embodiment, the number of connector terminals joined to the first conductor 132*a* may be other than four, e.g., it may be one, two, three or more than four. In another example, the plurality of connector terminals may be individually joined to the first conductor 132*a* instead of being put together by the common end 132*b*-2. In another example, the first conductor 132*a* may be divided into a plurality of conductors, and the connector terminals may be independently connected to the plurality of conductors, respectively.

Next, as one embodiment of a composite material structure producing method, a composite material structure producing method for obtaining the composite material structures 1, . . . , and 130 of the first to thirteenth embodiments will be described. The composite material structure producing method is basically substantially the same for the first to thirteenth embodiments, thus the following explanation is given with reference to a composite material structure producing method for obtaining the composite material structure 1 of the first embodiment as a representative example.

FIG. 27 is a schematic diagram illustrating a flow of a composite material structure producing method for obtaining the composite material structure of the first embodiment.

A composite material structure producing method shown in FIG. 27 includes a first step S11 and a second step S12.

The first step S11 is a step of covering, with an insulating material Z1 as a forming material for forming the insulator 13, a part of the conductor 12 in which the second conductor 12*b* is joined to the first conductor 12*a*. In this embodiment, the first step S11 is a step of covering, with the insulating material Z1, a covered portion 12*b*-3 including the connecting portion 12*b*-1 of the second conductor 12*b*.

A subsequent second step S12 is a step of forming the conductive resin portion 11 and the insulator 13 so as to expose the connecting portion 12*b*-1, using the conductor 12 partially covered with the insulating material Z1 and using a conductive reinforced resin Z2 comprising the base material 11*b* containing the conductive fiber sheet 11*a*-1. This second step S12 includes a pre-exposure step S121 and an exposure step S122.

The pre-exposure step S121 is a step of forming a pre-exposure structure 1*a* in which the conductor 12, including the connecting portion 12*b*-1, is entirely in a non-exposed state. In this pre-exposure structure 1*a*, a part of the conductor 12 including the connecting portion 12*b*-1 is covered with both the insulating material Z1 and the conductive reinforced resin Z2, and other parts are covered with the conductive reinforced resin Z2. This pre-exposure step S121 further includes a sheet placing step S121*a*, a base material impregnation step S121*b*, and a processing/polishing/cleaning step S121*c*.

The sheet placing step S121*a* is a step of arranging the plurality of conductive fiber sheets 11*a*-1 in a stack so as to sandwich therebetween the conductor 12 that is partially covered with the insulating material Z1. At this time, the conductive fiber sheets 11*a*-1 are arranged in the stack so as to overlap a part of the insulating material Z1 other than the part thereof covering the connecting portion 12*b*-1. The subsequent base material impregnation step S121*b* is a step of covering the conductor 12 and a part of the insulator 13 with the conductive reinforced resin Z2, by impregnating the plurality of conductive fiber sheets 11*a*-1 with the molten base material 11*b* and curing it. The subsequent processing/polishing/cleaning step S121*c* is a step of processing/polishing the cured conductive reinforced resin Z2 formed in the base material impregnation step S121*b* into the conductive resin portion 11 including a desired shape and then cleaning off the polished powder. After this processing/polishing/cleaning step S121*c*, the pre-exposure structure 1*a* is completed.

The exposure step S122 following the pre-exposure step S121 is a step of exposing the connecting portion 12*b*-1 by removing, from the pre-exposure structure 1*a*, the insulating material Z1 covering the connecting portion 12*b*-1 of the conductor 12. After the exposure step S122, the insulator 13 is completed, and the composite material structure 1 is obtained.

According to the composite material structure producing method described above, the composite material structure 1 in which occurrence of galvanic corrosion is prevented while exposing the part of the conductor 12 embedded in the conductive resin portion 11 as the connecting portion 12*b*-1 can be obtained, as described above.

Further, in this embodiment, the connecting portion 12*b*-1 of the conductor 12 is protected by the insulative material Z1 that is provided as a cover in the first step S11 until the connecting portion 12*b*-1 is exposed in the exposure step S122. This protection can prevent galvanic corrosion during the production, e.g., during the processing/polishing/cleaning step S121*c*.

It should be noted that embodiments described above only show representative forms of the composite material structure and the composite material structure producing method, and the composite material structure and the composite material structure producing method are not limited thereto and can be variously modified and implemented.

For example, the above-described embodiments exemplary show the composite material structures 1, . . . , 130 in which various shapes, etc. are illustrated with respect to the general appearance and the internal structure of the composite material structure. However, the composite material structure is not limited thereto, and the appearance and the internal structure thereof may be set arbitrarily according to the usage.

LIST OF REFERENCE SIGNS 1, 2, 3, 4, 5, 6, 7, 8, 9, 100, 110, 120, 130 composite material structure
1*a* pre-exposure structure
11,81,91,101,111,121,131 conductive resin portion
11*a* conductive fiber
11*a*-1 conductive fiber sheet
11*b* base material
12, 22, 42, 62, 72, 82, 92, 102, 112, 122, 132 conductor
12*a*, 102*a*, 112*a*, 122*a*, 132*a* first conductor
12*b*, 42*b*, 62*b*, 72*b*, 82*b*, 92*b*, 102*b*, 112*b*, 122*b*, 132*b* second conductor
12*b*-1, 62*b*-1, 72*b*-1, 92*b*-1, 102*b*-1, 112*b*-1, 122*b*-1, 132*b*-1 connecting portion
12*b*-2, 8*a*, 100*a* through hole
12*b*-3 covered portion
13, 33, 53, 63, 73, 83, 93, 103, 113, 123, 133 insulator
42*c*, 53*a* protrusion
64, 124 covered electric wire
64*a*, 124*a* round terminal
72*b*-2, 92*b*-2, 132*b*-2 common end
74, 94, 134 connector
81*a*, 91*a* first plane 81b, 91b second plane
81c, 91c standing plane
101a, 111a, 121a, 131a surface
101b recess
B1, B8, B10, B11 bolt
N1, N8, N10, N11 nut
W1, W8, W10, W11 electric wire with terminal
W11, W81, W101, W111 exposed core wire
W12, W82, W102, W112 round terminal
WS8, WS10 insulating washer
D101 depth direction
Z1 insulating material
Z2 conductive reinforced resin
S11 first step
S12 second step
S121 pre-exposure step
S122 exposure step
S122a sheet placing step
S122b base material impregnation step
S122c processing/polishing/cleaning step

What is claimed is:

1. A composite material structure comprising:
a conductive resin portion formed of an electrically conductive reinforced resin in which conductive fibers are contained in a base material;
a conductor formed of an electrically conductive material and embedded in the conductive resin portion with a part of the conductor exposed from the electrically conductive reinforced resin as a connecting portion for electrical connection with another component; and
an insulator which is formed of an insulating material and at least a part of which is embedded in the conductive resin portion so as to be interposed between the conductive reinforced resin and the conductor so as to prevent the connecting portion of the conductor from contacting the conductive reinforced resin.

2. The composite material structure according to claim 1, wherein
a part of the insulator protrudes from a surface of the conductive resin portion, and
the connecting portion of the conductor is a part of the conductor exposed from the part of the insulator protruding from the conductive resin portion.

3. The composite material structure according to claim 1, wherein
the insulator is formed such that a part of the insulator is exposed flush with a surface of the conductive resin portion, and
the connecting portion of the conductor is a part of the conductor exposed from the part of the insulator exposed from the conductive resin portion.

4. The composite material structure according to claim 1, wherein
the connecting portion of the conductor is a part of the conductor protruding from a part of the insulator exposed from the conductive resin portion.

5. The composite material structure according to claim 1, wherein
the connecting portion of the conductor is a part of the conductor exposed from, in a manner flush with, a surface of the part of the insulator exposed from the conductive resin portion.

6. The composite material structure according to claim 1, wherein
the conductive resin portion includes a step-shaped portion including a first plane and a second plane arranged one step lower from the first plane,
the insulator is formed such that a part of the insulator is exposed from the second plane of the conductive resin portion, and
the connecting portion of the conductor is a part of the conductor exposed from the part of the insulator exposed from the conductive resin portion.

7. The composite material structure according to claim 1, wherein
the conductive resin portion includes a cylindrical recess formed on a surface of the conductive resin portion,
the conductor is embedded in the conductive resin portion such that a part of the conductor is exposed as the connecting portion so as to form a bottom of the recess, and
the insulator is embedded in the conductive resin portion so as to be interposed between the conductive reinforced resin and the conductor with a part of the insulator exposed at least at the bottom side, in a depth direction of the recess, of an inner circumferential surface of the recess.

8. The composite material structure according to claim 1, wherein
the conductor includes a first conductor and a second conductor, the first conductor being entirely embedded in the conductive resin portion, the second conductor being joined to the first conductor inside the conductive resin portion, and a part of the second conductor being the connecting portion.

9. The composite material structure according to claim 8, wherein
the second conductor is an electrode.

10. The composite material structure according to claim 8, wherein
one end of a covered electric wire is joined to the first conductor inside the conductive resin portion,
another end side of the covered electric wire protrudes from the conductive resin portion with a part of a cover of the covered electric wire remaining inside the conductive resin portion, a part of a core wire of the covered electric wire being exposed at the another end side,
the second conductor is the core wire of the covered electric wire, the connecting portion of the second conductor being the core wire exposed at the another end side, and
the insulator is the cover of the covered electric wire.

11. The composite material structure according to claim 8, wherein
a side of a connector terminal of a connector opposite to an another terminal connecting-side of the connector terminal, is joined to the first conductor inside the conductive resin portion,
the connector is arranged such that a connecting side thereof for connection with another connector protrudes from the conductive resin portion with a part of a connector housing remaining inside the conductive resin portion, and, at this connecting side, the another terminal connecting-side of the connector terminal is exposed from the connector housing,
the second conductor is the connector terminal, the another terminal connecting-side of the connector terminal being the connecting portion, and
the insulator is the connector housing.

* * * * *